US012569848B2

(12) United States Patent
Ohlander et al.

(10) Patent No.: US 12,569,848 B2
(45) Date of Patent: *Mar. 10, 2026

(54) MICROFLUIDIC DEVICES

(71) Applicant: Capitainer AB, Solna (SE)

(72) Inventors: Anna Ohlander, Stockholm (SE); Gabriel Lenk, Freiburg (DE)

(73) Assignee: Capitainer AB, Solna (SE)

( * ) Notice: Subject to any disclaimer, the term of this patent is extended or adjusted under 35 U.S.C. 154(b) by 763 days.

This patent is subject to a terminal disclaimer.

(21) Appl. No.: 17/858,307

(22) Filed: Jul. 6, 2022

(65) Prior Publication Data

US 2022/0410147 A1 Dec. 29, 2022

Related U.S. Application Data

(63) Continuation of application No. PCT/SE2022/050645, filed on Jun. 28, 2022.

(30) Foreign Application Priority Data

Jun. 29, 2021 (SE) .................................... 2150835-3
Jun. 29, 2021 (SE) .................................... 2150836-1

(51) Int. Cl.
*B01L 3/00* (2006.01)
*B01L 9/00* (2006.01)

(52) U.S. Cl.
CPC ..... *B01L 3/502753* (2013.01); *B01L 3/50273* (2013.01); *B01L 3/502738* (2013.01);
(Continued)

(58) Field of Classification Search
None
See application file for complete search history.

(56) References Cited

U.S. PATENT DOCUMENTS 12,214,350 B2 * 2/2025 Ohlander .......... B01L 3/502723
2009/0152187 A1 6/2009 Shin et al.
(Continued)

FOREIGN PATENT DOCUMENTS

WO 2011/003689 A2 1/2011
WO 2015/044454 A2 4/2015
(Continued)

OTHER PUBLICATIONS

Al-Halhouli, Ala'aldeen et al., Spiral Microchannels with Trapezoidal Cross Section Fabricated by Femtosecond Laser Ablation in Glass for the Inertial Separation of Microparticles, Micromachines, vol. 9(1): 171, pp. 1-12 (Apr. 2018).
(Continued)

*Primary Examiner* — Maris R Kessel
*Assistant Examiner* — May Leung Chiu
(74) *Attorney, Agent, or Firm* — Porter Wright Morris & Arthur LLP

(57) ABSTRACT

A multilayer microfluidic device comprising: an inlet section comprising an inlet port and configured to transport and access the sample to a flat, laterally extending filtration membrane; a metering section, comprising an extraction chamber configured to receive an extracted body fluid from the filtration membrane and arranged in fluid communication with a metering channel; and an outlet section comprising a capillary means for collection of the metered volume of body fluid, wherein a roof of the extraction chamber is defined by a flat lower surface of the filtration membrane, and a floor of the extraction chamber is continuous with a floor of the metering channel and extends at an acute angle from the lower surface of the filtration membrane, and wherein the floor of the extraction chamber is inclined with respect to the floor of the metering channel to create a slope.

12 Claims, 21 Drawing Sheets

(52) U.S. Cl.
CPC ....... *B01L 9/527* (2013.01); *B01L 2200/0605* (2013.01); *B01L 2200/0684* (2013.01); *B01L 2300/0681* (2013.01); *B01L 2300/0867* (2013.01); *B01L 2300/126* (2013.01); *B01L 2400/0406* (2013.01); *B01L 2400/0457* (2013.01)

(56) References Cited

U.S. PATENT DOCUMENTS

| | | | | |
|---|---|---|---|---|
| 2014/0332098 | A1 | 11/2014 | Juncker et al. | |
| 2015/0087079 | A1* | 3/2015 | Coffey | G01N 33/54306 436/501 |
| 2015/0147777 | A1 | 5/2015 | Dothie | |
| 2016/0101420 | A1* | 4/2016 | Vermaas | B01D 17/0214 506/40 |
| 2021/0221676 | A1* | 7/2021 | Han | C08F 2/48 |

FOREIGN PATENT DOCUMENTS

| | | | | |
|---|---|---|---|---|
| WO | 2016/209147 | A1 | 12/2016 | |
| WO | 2020/050770 | A1 | 3/2020 | |
| WO | WO-2021077230 | A1 * | 4/2021 | G01N 15/1484 |

OTHER PUBLICATIONS

Betancur, Veronica et al., Integrated Lateral Flow Device for Flow Control with Blood Separation and Biosensing, Micromachines, vol. 8, No. 367, pp. 1-19 (2017).
Choi, Munseok et al., Hydrophilic strips for preventing air bubble formation in a microfluidic chamber, Electrophoresis, vol. 36, pp. 2896-2901 (2015).
Futai, Nobuyuki et al., Microfluidic Long-Term Gradient Generator with Axon Separation Prototyped by 185 nm Diffused Light Photolithography of SU-8 Photoresist, Micromachines, vol. 10(1): 9, pp. 1-11 (2019).
Gao, Qingxue et al., A simple and rapid method for blood plasma separation driven by capillary force with an application in protein detection, Analytical Methods, vol. 12, pp. 2560-2570, (Apr. 24, 2020).
Guan, Guofeng et al., Spiral microchannel with rectangular and trapezoidal cross-sections for size based particle separation, Scientific Reports, vol. 3, No. 1475, pp. 1-9 (2013).
Hauser, Janosch et al., High-Yield Passive Plasma Filtration from Human Finger Prick Blood, Analytical Chemistry, vol. 90, pp. 13393-13399 (2018).
Hauser, Janosch, An Autonomous Microfluidic Device for Generating Volume-Defined Dried Plasma Spots, Analytical Chemistry, vol. 91, pp. 7125-7130 (2019).
He, Weiqi et al., One-step electroplating 3D template with gradient height to enhance micromixing in microfluidic chips, Microfluid Nanofluid, vol. 19, pp. 829-836 (2015).
Lee, Wonjae et al., Detection of Pathogenic Bacteria Using Size-based Separation in Helical Channel with Trapezoid Cross-Section, Scientific Reports, vol. 5, No. 7717 (Jan. 12, 2015).
Wang, Xiang et al., Concentration gradient generation methods based on microfluidic systems, RSC Advances, vol. 7, pp. 29966-29984 (2017).
Zimmermann, Martin et al., Capillary pumps for autonomous capillary systems, Lab Chip, vol. 7, pp. 119-125 (2007).
Chung, Bong Geun et al., Microfluidic gradient platforms for controlling cellular behavior, Electrophoresis, vol. 31, pp. 3014-3027 (Jun. 6, 2010).

* cited by examiner

3A
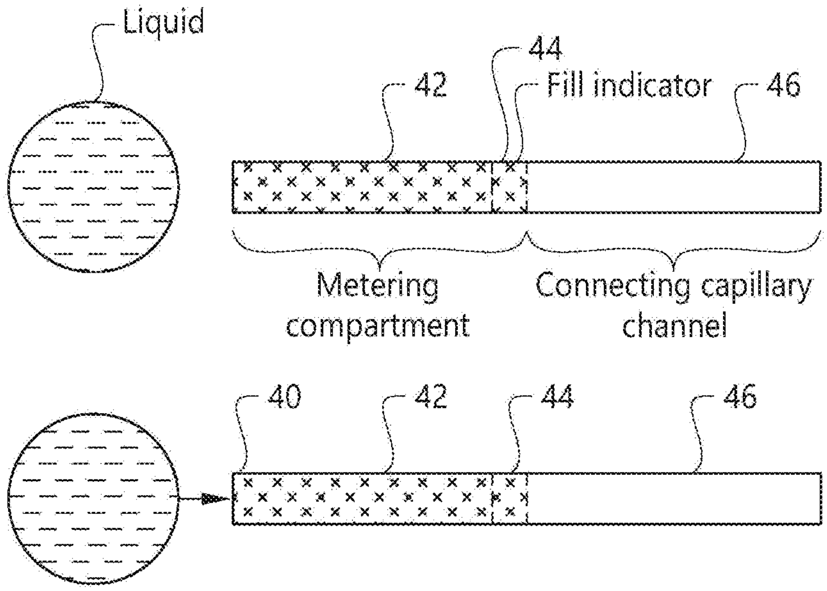
3B
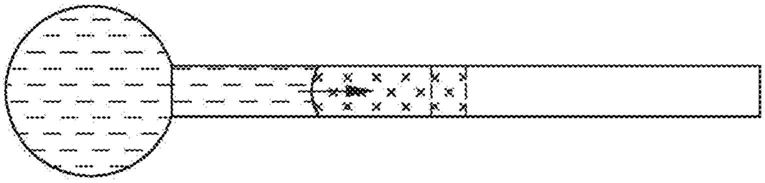
3C
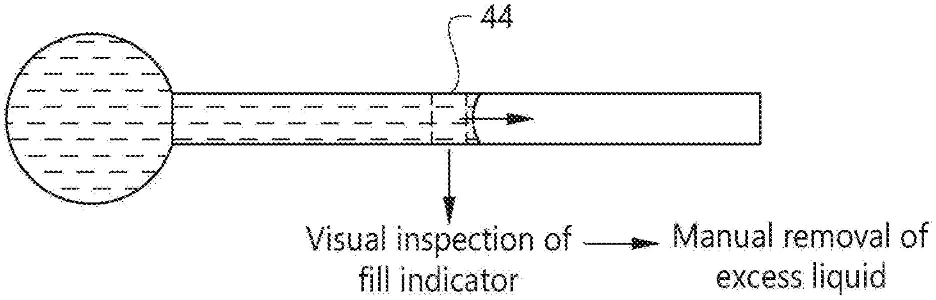
3D
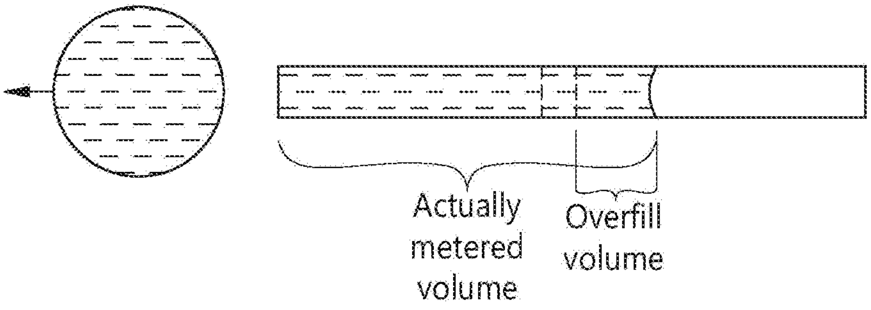
FIG. 3A-D

A-A

B-B

A

B

A-A

A-A

B-B

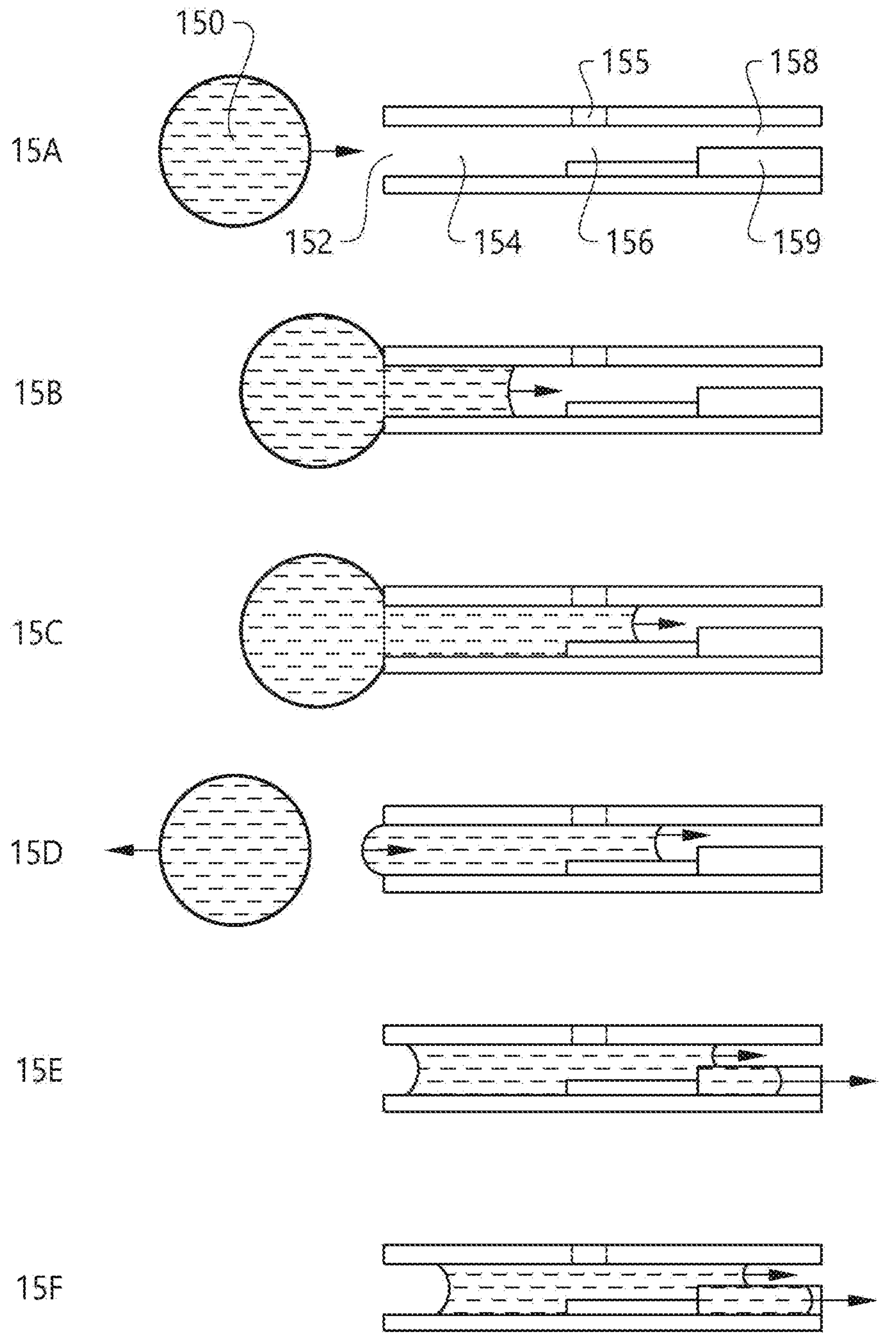
FIG. 15A-F

MICROFLUIDIC DEVICES

RELATED APPLICATIONS

This application is a continuation of International Patent Application Serial No. PCT/SE2022/050645, filed on Jun. 28, 2022, which claims priority to Swedish Patent Application No. 2150835-3, filed Jun. 29, 2021, and Swedish Patent Application No. 2150836-1, filed Jun. 29, 2021, which are hereby incorporated herein by reference.

TECHNICAL FIELD

The present disclosure relates generally to microfluidic plasma extraction and metering thereof from whole blood, specifically to a microfluidic device configured to sample and collect a metered volume of body fluid for analysis by means of capillary transport, comprising a filtration membrane configured to separate selected cells from the body fluid and extract the body fluid.

BACKGROUND ART

Separation of plasma from whole blood is a key step within whole-blood testing for clinical diagnostics and biomedical research purposes. Blood sampling is conventionally done through venipuncture and collection of 5-10 ml of whole blood in a tube. For analysis, plasma is usually the preferred substance; it is obtained through centrifugation in a centralized laboratory prior to analysis. An alternative collection method to handling liquid samples in tubes, is to apply the blood on a paper material and allow the sample to dry in on the paper. In the laboratory, the dried blood can be re-dissolved and prepared for analysis through wet chemistry. This method is called Dried Blood Spot analysis (DBS) and when combined with a separation technology for retaining blood cells, one can also obtain Dried Plasma Spots (DPS). This methodology has gained popularity as it brings the advantage of no requirement for maintaining a cold chain during transportation to the lab. The simplicity of the storage format also opens up for capillary home sampling by finger prick.

Microfluidic systems and Lab-on-Chips are solutions for reducing time and cost of biochemical assays. Through miniaturization, the volumes to be analyzed are reduced which shortens reaction times and reduces the consumption of expensive reagents amongst others. Microfluidic technology has been applied for plasma extraction purposes. Separation of blood cells from plasma on the microscale can be achieved either actively (externally applied force such as electrical or magnetic field) or passively (sedimentation, filtration or hydrodynamic effects induced by microfeatures). Further paper-based, and centrifugal microfluidics also can be applied.

For example, US 2014/0332098 A1 discloses circuit elements for self-powered, self-regulating microfluidic circuits including programmable retention valves, programmable trigger valves, enhanced capillary pumps, and flow resonators. Some embodiments allow for the flow direction within a microfluidic circuit to be reversed as well as for retention of reagents prior to sale or deployment of the microfluidic circuit for eased user use.

Many biochemical analyses require quantitation of analytes. To determine the precise concentration of an analyte in a sample, knowledge of the precise sample volume is required. On a microfluidic level, metering of liquids can again be achieved actively or passively. Examples of active means of dividing a volume of fluid into two or more volumes are by introducing components such as active valves that mechanically interfere with the liquid volume to split it up in units or passive valves in combination with pressurized air that can tear off parts of a liquid. In droplet microfluidics, shear forces that appears between two immiscible liquid phases (oil and water) in certain microfluidic geometries (T-junctions) are exploited for liquid compartmentalization. Passive metering has been reported less frequently in the literature. WO 2016/209147 A1 demonstrates passive metering using two dissolvable membranes integrated in a microchannel. Further, US 2015/0147777 A1 uses intersecting overspill channel structures containing absorbing materials for metering. WO 2015/044454 A2 discloses a microfluidic device for collecting and transporting biofluids, preferably whole blood, and includes a slope and a metering channel for collecting a metered sample. This device has a first region with a low flow resistance, comprising inlet features, and a second region comprising the metering channel with a high flow resistance, which is an arrangement that may cause problems related to obtaining a stable performance adapted to different flows resulting from variations in blood characteristics.

It is desirable to enable completely autonomous systems for plasma sampling. Such an autonomous system for plasma sampling has the advantage of requiring minimal interaction from the user running the process, thereby allowing a reduced training level of the user and a reduced risk of errors during sampling. An autonomous system by passive means on a microfluidic level would further reduce the complexity and cost of the system, as no external driving forces requiring power sources etc. would be required to run the microfluidic functions. However, developing such a system would involve substantial design challenges, such as making the system tolerate a wide range of whole blood characteristics in terms of varying hematocrit, lipid content and coagulation factors which vary largely between individuals, because these variances generate differences in flow characteristics in the system which would be easier to manipulate by active flow manipulation. The present disclosure is directed to improvements that solves the mentioned problems, while resulting in a volume defined plasma sample.

One aspect of the problems to be addressed in the microfluidic device involves microfluidics, specifically, how to generate a height gradient in a microfluidic substrate. The fabrication of microfluidic channels with a gradient in channel height seldomly occurs in research or in industrial microfluidic applications due to the difficulty in fabricating slants or slopes on microfluidic substrates. Slants may be produced through CNC micro milling, electroplating or 3D printing. The generated piece could then be used as a mould for injection moulding or polymer casting for example. Unfortunately, these methods are limited in resolution, thereby producing a stepwise ladder rather than a slope, and are costly.

Height gradients serve important purposes in microfluidic systems. For example, He et al used a slanted feature in a microfluidic mixer to increase its efficiency by 10%. Microfluidics and Nanofluidics volume 19, pages 829-836(2015). Microfluidic channels with trapezoidal cross section have been applied in centrifugal microfluidics for particle separation purposes (Scientific Reports volume 3, Article number: 1475 (2013), Micromachines (Basel). 2018 April; 9(4): 171. Scientific Reports volume 5, Article number: 7717

(2015)). In these cases, the fabrication of such devices has relied on complex, non-scalable manufacturing protocols such as stereolithography.

Chemical or biomolecule concentration gradients in the microenvironment play a significant role in cellular behaviors such as metastasis, embryogenesis, axon guidance, and wound healing (Electrophoresis 2010 September; 31(18): 3014-27). Since their size is matched to the scale of the concentration gradients, microfluidics has become an efficient tool to manipulate fluidic flows and diffusion profiles to create biomolecular gradients for studying such cellular processes. The methods for generating concentration gradients generally exploit branched configurations of rectangular microfluidic channels [RSC Adv., 2017, 7, 29966-29984]. Futai et al produced a long-term concentration gradient generator by exploiting a height gradient in a microfluidic channel produced by manipulating the light exposure SU-8 resist to produce a slant in the PDMS mold [Micromachines (Basel). 2019 January; 10(1): 9.]

Lenk et al in Analytical chemistry 90 (22), 13393-13399 demonstrated the use of assembling a plasma extraction membrane in a slanted configuration in front of a microfluidic channel opening to form a wedge like structure between channel and membrane enabling initiation of capillary driven plasma extraction. Hauser et al in Analytical Chemistry 2019, 91, 7125-7130 shows a similar device with a pinch-off structure for a metered volume of extracted plasma and a porous plug for collecting the plasma. WO 2020/050770 discloses a T-shaped configuration of a metering channel and a bridging element between the metering channel and a porous matrix. However, the T-shaped configuration has proved disadvantageous due to its hematocrit dependency. Thus, these devices need improvements to conform with changes in capillarity within the device, to control or avoid introduction of air bubbles that may compromise accuracy or repeated reliable operation for a range of different blood hematocrit values. Additionally, improvements are necessary to comply with simple and efficient large scale production processes. For example, WO2011/003689 A2, discloses manufacturing problems related to slopes for liquid transportation. The formation of unwanted air bubbles is a general problem in microfluidics. Choi et al advises a solution with hydrophilic strips to overcome bubble formation when a fluid front enters from channel to higher volume compartment. US 2009/0152187 discloses a filter chip with plasma separation with a narrowing shape towards an outlet in order to speed up the filtration process. However, there is no disclosure of a metering function or how to balance capillarity in an inlet part of a microfluidic device with plasma separation.

SUMMARY OF INVENTION

An object of the present disclosure is to provide an autonomous microfluidic capillary driven device with an inlet and metering section for metering and collecting a sampled body fluid for analysis, with a controlled capillary transport with a channel system admitting increased capillarity.

An object of the present disclosure is to provide an inlet section of microfluidic device with controlled increase capillarity to access sample such as blood to filtration membrane to support distribution over the filtration membrane surface to expedite and control the extraction process of filtered body fluid such as plasma.

An object of the present disclosure is to introduce a function in a microfluidic device such that sufficient volume of body fluid is received in the device, that relies on simple observations and convenient user interactions to correct insufficiently received volumes.

An object of the present disclosure is to provide a device that is capillary driven with a filtration membrane for filtration of body fluids that allows for correct separation of a well-defined volume of a filtered body fluid from a remaining fluid plug that consists of unfiltered body fluid and filtered body fluid.

An object of the present disclosure is to provide a device that is capillary driven for a filtration of body fluids and with a metering function that relies on air liquid interfaces with controlled air bubble introduction to support correct transportation and separation of the metered fluid for collection.

It is also an object of the present disclosure to provide a microfluidic device that is able to filter and transport a blood sample, correctly meter the obtained plasma and separate metered plasma sample, that reliably operates for all blood hematocrit levels.

It is also an object of the present disclosure to provide a microfluidic device that admits a controlled input volume of sample body fluid to be received and that correlates with the dead volume of the device and a defined output volume to be collected for analysis.

In general aspects of the present disclosure and in the following, it is referred to chambers and channels of the system with carefully selected configurations in order to correctly transport, filter, meter and collect the body fluid. Such configurations will include dimensions of the chambers or channels designed to suitably support transportation and separating and collecting a metered volume. The dimensions can be addressed in terms of "height", "width" of the chambers or channels. Other configurations can relate to the materials or other features making up the chambers or channels and in such contexts terms like "floor" and "roof" will be used. Accordingly, such terms will have a normal meaning for a skilled person. In context of the present disclosure, the microfluidic devices are arranged with "a connector", "a fluid connector" or "a connecting piece". When used, these terms represent linking channels or chambers in fluid communication with neighboring parts of device and dimensioned as disclosed to support a capillary transport in the device and may introduce specific functions to the device.

In general aspects of the present disclosure, the term "capillarity" relates to capillary pressures that exist at liquid-air interfaces, where surface tension, or interface tension exists. Capillarity depends on the dimensions of the device, such as the pore size of a membrane, the type of liquid, such as aqueous or organic, salt content, etc., and the dimensions and/or surface properties of a flow channel, such as hydrophobic or hydrophilic, including the degree of hydrophobicity or hydrophilicity of surfaces (contact angle). The terms "capillarity" and "capillary pressure" will both be used in various contexts of the present disclosure. For example, the term "capillarity" will be used to functionally describe features of the device such as channels and chambers. For example, the term "capillary pressure" will for example be used to when describing performing methods of the present disclosure to transport and meter a body fluid by means of the inventive device. A "capillary means" as referred to herein is a porous member that can act as capillary pump and collect the body fluid, for any subsequent analysis of body fluid constituents.

The term "flow reduction means" has a general meaning in the context of the present disclosure that features in channels or chambers of the device that temporarily reduce or stop the capillary flow of body fluid from an inlet to an outlet of the device. A flow reduction means is exemplified by a capillary stop valve, a dissolvable valve, a part of a channel with altered hydrophilicity, a part of a channel with changed dimensions, and a part a channel with increased flow resistance.

The term “pinch-off means” is used generally to describe parts of the present disclosure where a predefined volume of body fluid is separated from the remaining body fluid of the device. In this respect, the pinch-off is established by introducing an air bubble at a region in the device with low capillarity, where resistance to the entrance of air is at low point compared to surrounding regions. A “pinch-off means” according to the present disclosure can be located in a pinch-off region designed to induce a low capillary pressure to a transported liquid column that can be used to reduce the flow resistance to introduce and one or more air bubbles from one or more air vents in a pinch-off region and thereby disconnect a metered liquid volume from the remaining sampled volume with the device.

In general aspects of the present disclosure and in the following, a “capillary means” is a feature acting as a capillary pump and serving to collect the metered body fluid in the device for subsequent analysis of one or analytes, optionally in a filtered body fluid. The skilled person will understand that the capillary means has a controlled porosity adapted to other parts of the device, as further explained in WO2015/044454. In general aspects of the present disclosure and in the following, the term “body fluid” can relate to blood and the filtered body fluid is plasma. Other body fluids for transportation, metering and collection would also be conceivable to perform with device.

In a first aspect of the present disclosure, there is provided a microfluidic device configured to sample, meter and collect a metered volume of body fluid for analysis by means of capillary transport, wherein the device comprises: an inlet section for receiving a sample of body fluid, the inlet section comprising an inlet port and a channel system configured to transport the sample of body fluid; a filtration membrane configured to separate plasma from blood; a metering section, configured to meter a predefined volume of the received body fluid and disconnect it from remaining fluid in the device; and an outlet section configured to receive and collect the metered volume of body fluid from the metering section, the outlet section comprising a capillary means for collection of the metered volume, wherein the channel system comprises consecutively in the flow direction a first channel arranged in fluid communication with the inlet port, a second channel and a third channel, wherein the inlet section and the channel system are configured to transport the sample of body fluid to, and to distribute it across the filtration membrane with a stepwise or gradually increasing capillarity from the inlet section to the filtration membrane; the metering section comprises an extraction chamber configured to receive an extracted body fluid from the filtration membrane and arranged in fluid communication with a metering channel; and the metering section comprises a pinch-off means configured to separate the metered volume of body fluid, wherein the pinch-off means comprises at least one air vent arranged in a part of the extraction chamber with the maximum height.

By means of the stepwise or gradual increase in capillarity, it is ensured that the sample of body fluid is transported from the inlet section to the filtration membrane without pinning to guarantee continuous operation of the device. Additionally, the stepwise or gradual increase in capillarity enables distribution across the membrane such that filtration occurs substantially evenly throughout the membrane. By means of the air vent, an effective separation of the metered volume from the remaining volume of body fluid is achieved.

In one embodiment, the stepwise or gradual increase in capillarity of the channel system is established by successively, from the inlet port to the filtration membrane, decreasing the height of the channels and/or successively increasing the hydrophilicity of the channels.

In one embodiment, a floor of the third channel is defined by a flat upper surface of the filtration membrane. Thus, the third channel extends parallel to the filtration membrane forming a filtration chamber.

In one embodiment, a height ratio of the first channel to the second channel is at least 1.1:1, preferably at least 2:1, and wherein a height ratio of the second channel to the third channel is at least 1.1:1, preferably at least 2:1, preferably the height of the first channel is 500-2000 μm; the height of the second channel is 100-600 μm; and the height of the third channel is 25-200 μm.

In one embodiment, the second channel comprises a capillary stop valve and a means for visual filling inspection, such as an inspection window, both located adjacent to the first channel outlet. By means of the capillary stop valve, flow of body fluid through the channel system may be interrupted until supply of body fluid is removed from the inlet port, whereby the capillary stop valve bursts through increase in Laplace pressure on the droplet forming at the inlet port which overcomes the threshold pressure of the capillary stop valve. This may be used to meter the volume of the body fluid before it flows into the second channel. The user can check the level of filling in the means for visual inspection to ensure that a sufficient amount has been supplied.

In one embodiment, the capillary stop valve is selected from at least one of a part of the second channel with altered hydrophilicity and/or a part of the second channel with changed dimensions. The hydrophilicity and/or dimension of the second channel may be configured to achieve the desired threshold or burst pressure of the capillary stop valve. Preferably, the capillary stop valve is formed by an abrupt increase in height in the second channel.

In one embodiment, the pinch-off means comprises a pinch-off region, arranged in fluid communication with one or more air vents located before the entrance to the metering channel, wherein the pinch-off region comprises a height reducing element with a height lower than the maximum height of the extraction chamber. Preferably, the height reducing element has a through-hole to prevent from liquid pinning in the extraction chamber.

In one embodiment, the extraction chamber comprises a part with gradually increasing height, a part with the height reducing element and a part with a maximum height arranged in fluid communication with the metering channel.

In one embodiment, a roof of the extraction chamber is defined by a flat lower surface of the filtration membrane and a floor of the extraction chamber extends at an acute angle from a contact with the filtration membrane towards the metering channel. Preferably, the extraction chamber is generally wedge-shaped with a gradually increasing height from a contact point with the filtration membrane towards the metering channel and, wherein the maximum height of the extraction chamber exceeds the height of the metering channel. By means of the acute angle between the filtration membrane and the floor of the extraction chamber, it is possible to achieve a wedge-shaped extraction chamber which diverges towards the metering channel, thus enabling gradual filling of the space between the diverging surfaces, essentially forming a capillary pump. At the same time, it is possible to maintain a substantially flat, horizontal orientation of the filtration membrane, which facilitates integrating the filtration membrane in a chamber construction to protect a blood sample from evaporation and contamination during plasma extraction.

In one embodiment, the first channel has a volume correlated to the dead volume and the metered volume (the output volume) of the device. Preferably, the volume of the first channel is sufficient to prevent a front meniscus of a body fluid volume other than the metered volume from reaching the capillary means of the outlet section. The dead volume is the sum of all volumes that are not metered and collected in the capillary means at the outlet. In other words, the dead volume is the residual volume in the system which is distributed across the filtration chamber, the plasma extraction (filtration) membrane and the plasma extraction chamber. The plasma output (metered) volume is the volume that is separated from the dead volume, e.g., by a pinch-off effect. As the input volume applied to the inlet port by the user of the device will vary and the metered output volume is constant and predetermined by the device, the dead volume will also be variable within an acceptable range. Accordingly, the volume of the first channel is correlated to the dead volume and the output metered volume. By selecting the volume of the first channel in this way, it is ensured that only the necessary amount of blood required for the plasma sampling is admitted into the first channel.

In one embodiment, the metering channel has an outlet part with a dimensional change configured to cause a fluid front meniscus of the separated metered volume of body fluid, when transported to the outlet section, to assume a shape which substantially conforms to the surface geometry of the capillary means. By means of the dimensional change in the outlet part of the metering channel, the shape of the fluid front meniscus can be adapted to the geometry of the capillary means such that the shapes at the interface match each other. Thereby, the impact of the separated metered volume of body fluid with the capillary means can be controlled to prevent bubble formation between the two medias.

In one embodiment, the dimensional change comprises a reduction in width and/or height of the metering channel. By reducing the width and/or height, it is possible to induce forming of a substantially straight or planar meniscus, overcoming any effects of surface roughness or dimensional variances of the metering channel.

In one embodiment, a distal end of the outlet part of the metering channel adjacent the capillary means has a constant width which is smaller than the width of the metering channel. Preferably, the outlet part of the metering channel has a first part with a gradual reduction in width and second part with a constant width which is smaller than the width of the metering channel. The reduction in width causes the fluid meniscus to go from a convex shape to a substantially planar shape which matches the geometry of the capillary means.

In one embodiment, the surface geometry of the capillary means at an interface surface with the fluid front meniscus is curved or substantially planar.

In one embodiment, the outlet section comprises a hydrophilic porous bridge element with an average pore size smaller than the smallest dimension of the metering channel, and wherein the bridge element is arranged in fluid communication with the outlet part of the metering channel and with the capillary means. By providing a capillary means in two components, it is possible to introduce an increasing capillarity to ensure transport of the separated metered volume of body fluid from the metering channel to the paper substrate for collection.

Additionally, the first aspect of the present disclosure relates to a method for sampling, transporting and collecting a metered volume of body fluid for analysis by means of capillary transport in a microfluidic device, the method comprising the steps of: applying a supply of body fluid to an inlet port of the device; filling a channel system arranged in fluid communication with the inlet port, wherein the channel system comprises consecutively in the flow direction a first channel arranged in fluid communication with the inlet port, a second channel and a third channel; transporting a sample of body fluid with a stepwise or gradually increasing capillarity to a filtration membrane configured to separate plasma from blood; distributing the sample of body fluid across the filtration membrane; receiving filtered body fluid in a metering section comprising an extraction chamber, and a metering channel in fluid communication with the extraction chamber; transporting the filtered body fluid in the metering channel to an outlet section comprising a capillary means for collection of the filtered body fluid; disconnecting a metered volume of filtered body fluid by introducing at least one air bubble in a part of metering section inducing the lowest capillary pressure; and collecting the metered volume of filtered body fluid in the capillary means.

In one embodiment, the method is performed with a device according to the first aspect with a sample of blood to meter and collect blood plasma.

In a second aspect of the present disclosure, there is provided a microfluidic device configured to sample, meter and collect a metered volume of body fluid for analysis by means of capillary transport, wherein the device comprises: an inlet section for receiving a sample of body fluid, the inlet section comprising an inlet port and a channel system; a filtration membrane configured to separate plasma from blood, wherein the inlet section and the channel system are configured to transport the sample of body fluid to, and to distribute it across the filtration membrane with a stepwise or gradually increasing capillarity from the inlet section to the filtration membrane; a metering function, configured to meter a predefined volume of the received body fluid; and at least one porous medium for receiving the transported sample of body fluid.

By means of the stepwise or gradual increase in capillarity, it is ensured that the sample of body fluid is transported from the inlet section to the filtration membrane without pinning to guarantee continuous operation of the device. Additionally, the stepwise or gradual increase in capillarity enables distribution across the membrane such that filtration occurs substantially evenly throughout the membrane.

In one embodiment, the channel system comprises at least two channels, including a first channel arranged in fluid communication with the inlet port and with a second channel having a higher capillarity than the first channel. In one embodiment, a height ratio of the first channel to the second channel is at least 1.1:1, preferably at least 2:1. With at least two channels, the increase in capillarity can be achieved in at least two steps, for instance through a height reduction.

In one embodiment, the channel system comprises at least one of a flow reduction means and a means for visual filling inspection, such as an inspection window. Preferably, the means for filling inspection is provided in the second channel adjacent to the first channel. The flow reduction means and filling inspection means enable pre-metering by interrupting the flow of the sample such that the operator may stop application of body fluid to the device when a sufficient amount has been added, i.e., the channel system has been filled.

In one embodiment, the flow reduction means is selected from at least one of: a part of the second channel with altered hydrophilicity; a part of the second channel with changed dimensions; and a part of the second channel with increased flow resistance, preferably the flow reduction means is provided adjacent to the means for visual inspection. Preferably, the flow reduction means is a dissolvable valve or a capillary stop valve, preferably the capillary stop valve comprises an abrupt increase in the second channel height.

In one embodiment, the porous medium is configured to absorb and collect a received volume, preferably the porous flow medium is a lateral flow medium or a filter paper.

In one embodiment, the metering function comprises a metering section with an extraction chamber configured to receive an extracted body fluid from the filtration membrane and arranged in fluid communication with a metering channel, and wherein the device further comprises an outlet section configured to receive and collect the metered volume of body fluid from the metering channel, the outlet section comprising a capillary means for collection of the metered volume.

In one embodiment, the channel system comprises a first channel having a first capillarity and arranged in fluid communication with the inlet port and with a third channel having a second capillarity, the second capillarity being higher than the first capillarity, and wherein the third channel comprises a roof, optionally a vent, and is configured to homogenously distribute the sample of body fluid arriving from the first channel across the filtration membrane. Preferably, the third channel comprises a floor defined by a flat upper surface of the filtration membrane.

In one embodiment, the stepwise or gradual increase in capillarity of the channel system is established by successively, from the inlet port to the filtration membrane, decreasing the height of the channels and/or increasing the hydrophilicity of the channels. Preferably, the stepwise increase in capillarity of the channel system from the inlet port to the filtration membrane is established over at least two steps.

In one embodiment, the first channel has a volume correlated to the dead volume and the metered volume of the device, preferably the volume of the first channel is sufficient to prevent a front meniscus of a body fluid volume other than the metered volume from reaching the capillary means of the outlet section. The dead volume is the sum of all volumes that are not metered and collected in the capillary means at the outlet. In other words, the dead volume is the residual volume in the system which is distributed across the filtration chamber, the plasma extraction (filtration) membrane and the plasma extraction chamber. The plasma output (metered) volume is the volume that is separated from the dead volume, e.g., by a pinch-off effect. As the input volume applied to the inlet port by the user of the device will vary and the metered output volume is constant and predetermined by the device, the dead volume will also be variable within an acceptable range. Accordingly, the volume of the first channel is correlated to the dead volume and the output metered volume. By selecting the volume of the first channel in this way, it is ensured that only the necessary amount of blood required for the plasma sampling is admitted into the first channel.

In one embodiment, the device further comprises a second channel arranged between and in fluid communication with the first channel and the third channel. The second channel provides an additional step in the channel system to achieve the stepwise or gradual increase in capillarity. Preferably, the height ratio of the second channel to the third channel is at least 1.1:1, preferably at least 2:1.

In one embodiment, the extraction chamber is generally wedge-shaped with a gradually increasing height from a contact with the filtration membrane towards the metering channel, and wherein the maximum height of the extraction chamber is higher than the height of the metering channel. The wedge shape enables gradual filling of the extraction chamber.

In one embodiment, the device further comprises a pinch-off means configured to separate the metered volume of body fluid, wherein the pinch off means comprises at least one air vent arranged in a part of the extraction chamber with the maximum height. By means of the air vent, an effective separation of the metered volume from the remaining volume of body fluid is achieved.

In one embodiment, the pinch-off means comprises a pinch-off region in fluid communication with the at least one air vent, arranged adjacent an entrance to the metering channel, wherein the pinch-off region comprises a height reducing element with a height lower than the maximum height of the extraction chamber. Preferably, the extraction chamber comprises a part with gradually increasing height, a part with a height reducing element and a part with a maximum extraction chamber height in fluid communication with the metering channel. The height reducing element creates an increase in capillarity at the egress of the extraction chamber, thus ensuring continued transport and filtration of the body fluid through the filtration membrane.

In one embodiment, the height reducing element comprises a through-hole, to prevent liquid pinning.

Additionally, the second aspect of the present disclosure relates to a method of sampling, metering and collecting a body fluid sample for analysis by means of a microfluidic device as embodied in this second aspect. The method comprises applying a sample volume to an inlet port of the device and transporting the sample volume to a porous filtration membrane through a channel system admitting a successive increase in capillary pressure, preferably a stepwise increase of capillary pressure. The method further comprises admitting a still increased capillary pressure from a porous filtration membrane to separate cellular material and to extract remaining body fluid; receiving a filtered body fluid from the filtration membrane in an extraction chamber inducing gradually lower capillary pressure; filling a metering channel with the filtered body fluid by means of an increased capillary pressure; and disconnecting the fluid communication between the extraction chamber and the metering channel by introducing an air bubble at a point predetermined to subject the body fluid to the lowest capillary pressure; and collecting the metered body fluid in a capillary means comprised in an outlet section. Preferably, the fluid communication between the extraction chamber and the metering channel is disconnected when the metered body fluid contacts the capillary means.

In embodiments of the method, a volume of the body fluid is manually applied the inlet port; from the inlet port the body fluid is admitted to fill a first channel, whereupon once the first channel is filled, a flow reduction means temporarily stops or reduces the body fluid transport. After safeguarding that the device is correctly filled, excess body fluid is removed from the inlet port so further transport is admitted to the separating, metering and collection procedures.

In a third aspect of the present disclosure, there is provided a microfluidic device configured to sample, meter and collect a metered volume of body fluid for analysis by means of capillary transport, wherein the device comprises: an inlet section, for receiving a sample of body fluid, the inlet section comprising an inlet port; a metering section configured to receive body fluid from the inlet section and comprising a metering channel, wherein the metering section is arranged to separate a metered volume of body fluid filled in the metering channel; and an outlet section configured to receive and transport the separated metered volume of body fluid for collection in a capillary means having a predetermined surface geometry, wherein the metering channel has an outlet part with a dimensional change configured to cause a fluid front meniscus of the separated metered volume of body fluid, when transported to the outlet section, to assume a shape which substantially conforms to the surface geometry of the capillary means.

By means of the dimensional change in the outlet part of the metering channel, the shape of the fluid front meniscus can be adapted to the geometry of the capillary means such that the shapes at the interface match each other. Thereby, the impact of the separated metered volume of body fluid with the capillary means can be controlled to prevent bubble formation between the two medias.

In one embodiment, the dimensional change comprises a reduction in width and/or height of the metering channel. By reducing the width and/or height, it is possible to induce forming of a substantially straight or planar meniscus, overcoming any effects of surface roughness or dimensional variances of the metering channel.

In one embodiment, a distal end of the outlet part of the metering channel adjacent the capillary means has a constant width which is smaller than the width of the metering channel. Preferably, the outlet part of the metering channel has a first part with a gradual reduction in width and second part with a constant width which is smaller than the width of the metering channel. The reduction in width causes the fluid meniscus to go from a convex shape to a substantially planar shape which matches the geometry of the capillary means.

In one embodiment, the surface geometry of the capillary means at an interface surface with the fluid front meniscus is curved or substantially planar.

In one embodiment, the capillary means comprises a bridge element arranged in fluid communication with the outlet part of the metering channel and a paper substrate connected to the bridge element. Preferably, the bridge element is a hydrophilic porous element with an average pore size smaller than the smallest dimension of the metering channel. By providing a capillary means in two components, it is possible to introduce an increasing capillarity to ensure transport of the separated metered volume of body fluid from the metering channel to the paper substrate for collection.

In one embodiment, the bridge element, is made from a material selected from at least one of micro paper pulp, micro fibrillated cellulose, an open cell hydrophilic polymer or a highly compressible glass fiber web.

In one embodiment, the surface geometry of the bridge element at an interface surface with the fluid front meniscus is curved or substantially planar.

In one embodiment, the device further comprises a filtration membrane configured to separate selected cells from the body fluid, wherein the inlet section is configured to transport the sample of body fluid to, and to distribute it across the filtration membrane and wherein the metering section comprises an extraction chamber configured to receive body fluid from the filtration membrane and to transport the received body fluid to the metering channel. By means of the filtration membrane, it is possible to separate e.g., plasma from whole blood for collection in the capillary means.

In one embodiment, the device further comprises a pinch-off means configured to separate the metered volume of body fluid, wherein the pinch-off means comprises at least one air vent arranged in a part of the extraction chamber with a maximum height. By means of the air vent, an effective separation of the metered volume from the remaining volume of body fluid is achieved.

In one embodiment, the pinch-off means comprises a pinch-off region in fluid communication with the at least one air vent, the pinch-off region being arranged in the part of the extraction chamber with the maximum height and surrounded by areas with lower height. Preferably, at least one part of the extraction chamber surrounding the pinch-off region has a height lower than the height of the metering channel. The surrounding areas of lower height lead to a reduction of the capillary pressure in the pinch-off region, thus promoting introduction of an air bubble.

In one embodiment, the metering section comprises a fluid connector extending between the extraction chamber and the metering channel, and an air vent. The air vent may be arranged adjacent to, or at the position where the fluid connector meets the metering channel. Preferably, the air vent is arranged at the entrance of the metering channel and is configured as an orifice to ambient air with a cross-sectional area equal to or greater than the size of the cross-sectional area of the metering channel. The air vent is thus placed in a location of the device with low capillary pressure, optimal for introducing an air bubble downstream of the extraction chamber and upstream of the metering channel to separate the metered volume of body fluid.

In one embodiment, the fluid connector has a different dimension than the metering channel, the dimension being selected from one or more of height, width and length. Preferably, the fluid connector has a gradually increasing height towards the entrance of the metering channel. Thereby, the fluid/air interface is increased to facilitate introduction of an air bubble.

In one embodiment, the maximum height of the extraction chamber is lower than the height of the metering channel.

Additionally, the third aspect of the present disclosure relates to a method for sampling, transporting and collecting a metered volume of body fluid for analysis by means of capillary transport from an inlet to a capillary means of a microfluidic device, the method comprising the steps of: applying a sample of body fluid to an inlet port of the device and transporting the body fluid, optionally through a filtration membrane, to a metering channel; admitting the metering channel to transport the sample of body fluid to an outlet section comprising a capillary means having a predetermined surface geometry; receiving the metered fluid in the capillary means and separating a metered volume of body fluid from the remaining sample volume by introducing at least one air bubble at a point of the device upstream of the metering channel exhibiting low capillary pressure; and collecting the metered volume of body fluid in the capillary means, wherein an outlet part of the metering channel comprises a dimensional change which causes a fluid front meniscus of the separated metered volume of body fluid, when transported to the outlet section, to assume a shape which substantially conforms to the surface geometry of the capillary means.

In a fourth aspect of the present disclosure, there is provided a method of manufacturing an outlet section of a microfluidic device configured to sample, meter and collect a metered volume of body fluid for analysis by means of capillary transport; the method comprising: providing a microfluidic device having an outlet section in fluid communication with a metering section comprising a metering channel configured to receive body fluid from an inlet section with an inlet port, wherein the outlet section comprises a bridge cavity between an outlet part of the metering channel and an outlet orifice of the device; providing a hydrophilic porous bridge element arranged to conform to the shape of the bridge cavity; inserting the bridge element into the bridge cavity, such that the bridge element substantially fills the bridge cavity and the outlet orifice; and attaching a capillary means to the outlet section, thereby establishing contact between the capillary means and the bridge element.

By inserting a conformable hydrophilic porous bridge element into the bridge cavity in such a way that the bridge cavity is substantially filled, the need for high precision cutting and placement of a porous element into the outlet is reduced or eliminated. Instead, the method according to the fourth aspect enables application of the solution in automatized high throughput mass manufacturing.

In one embodiment, inserting causes the bridge element to protrude into the metering channel. Preferably, inserting causes a surface of the part of the bridge element which protrudes into the metering channel to assume a shape which substantially conforms to a fluid front meniscus of a metered volume of body fluid in the metering channel. Thus, the impact of the separated metered volume of body fluid with the bridge element can be controlled to prevent bubble formation between the two medias.

In one embodiment, the bridge element is made of a compressible porous material and has a volume which is larger than a volume of the bridge cavity, and wherein inserting comprises compressing the bridge element into the bridge cavity. With a compressible material, the bridge element is simply inserted by compressing it into the bridge cavity and ensures that no gaps are formed between the bridge cavity and the bridge element.

In one embodiment, the bridge element is made of a dispensable porous material, and wherein inserting comprises dispensing the porous material into the bridge cavity such that it protrudes outside the outlet orifice and allowing the porous material to set to form the bridge element. With a dispensable material, the bridge element is simply dispensed into the bridge cavity and ensures that no gaps are formed between the bridge cavity and the bridge element. In this context, dispensable material encompasses any suitable material e.g., in liquid form which may be dispensed through a nozzle or similar into the bridge cavity and subsequently cure or set into solid form.

In one embodiment, the capillary means is configured to exert a higher capillary pressure on the body fluid than the bridge element, and wherein the bridge element has an average pore size smaller than the smallest dimension of the metering channel. This ensures that the sample of body fluid is transported from the metering channel through the bridge element to the capillary means.

In one embodiment, the bridge element is made from a material selected from at least one of micro paper pulp, micro fibrillated cellulose, an open cell hydrophilic polymer or a highly compressible glass fiber web.

Additionally, the fourth aspect relates to a microfluidic device configured to sample, meter and collect a metered volume of body fluid for analysis by means of capillary transport, the device comprising: an inlet section, for receiving the body fluid sample, the inlet section comprising an inlet port; a metering section configured to receive body fluid from the inlet section and comprising a metering channel, wherein the metering section is arranged to separate a metered volume of body fluid filled in the metering channel; and an outlet section comprising a bridge cavity between an outlet part of the metering channel and an outlet orifice of the device, a hydrophilic porous bridge element arranged to conform to the shape of the bridge cavity and inserted in the bridge cavity such that the bridge element substantially fills the bridge cavity and the outlet orifice, and a capillary means attached to the outlet section in contact with the bridge element.

In one embodiment, the device further comprises a filtration membrane configured to separate selected cells from the body fluid, wherein the inlet section is configured to transport the sample of body fluid to, and to distribute it across the filtration membrane and the metering section comprises an extraction chamber configured to receive body fluid from the filtration membrane and to transport the received body fluid to the metering channel. By means of the filtration membrane, it is possible to separate e.g., plasma from whole blood for collection in the capillary means.

In one embodiment, the metering section comprises a fluid connector extending between the extraction chamber and the metering channel, and an air vent. The air vent may be arranged adjacent to, or at the position where the fluid connector meets the metering channel. The air vent is thus placed in a location of the device with low capillary pressure, optimal for introducing an air bubble downstream of the extraction chamber and upstream of the metering channel to separate the metered volume of body fluid. Preferably, the fluid connector has a different dimension than the metering channel, the dimension being selected from one or more of height, width and length.

In one embodiment, the outlet part of the metering channel is configured to cause a fluid front meniscus of the separated metered volume of body fluid, when transported to the outlet section, to assume a shape which substantially conforms to the surface geometry of the capillary means. Preferably, the surface of the bridge element facing the metering channel is curved or substantially planar. Thus, the impact of the separated metered volume of body fluid with the bridge element can be controlled to prevent bubble formation between the two medias.

In one embodiment, the device further comprises a pinch-off means configured to separate the metered volume of body fluid, wherein the pinch-off means comprises at least one air vent arranged in a part of the extraction chamber with a maximum height. By means of the air vent, an effective separation of the metered volume from the remaining volume of body fluid is achieved.

In one embodiment, the pinch-off means comprises a pinch-off region in fluid communication with the at least one air vent, the pinch-off region being arranged in the part of the extraction chamber with the maximum height and surrounded by areas with lower height. Preferably, at least one part of the extraction chamber surrounding the pinch-off region has a height lower than the height of the metering channel. The surrounding areas of lower height lead to a reduction of the capillary pressure in the pinch-off region, thus promoting introduction of an air bubble.

In one embodiment, the maximum height of the extraction chamber is lower than the height of the metering channel.

In one embodiment, the extraction chamber is substantially wedge-shaped, wherein a roof of the extraction chamber is defined by flat lower surface of the filtration membrane, and wherein a hydrophilic floor of the extraction chamber extends at an acute angle from a contact with the filtration membrane towards the metering channel. By means of the acute angle between the filtration membrane and the floor of the extraction chamber, it is possible to achieve a wedge-shaped extraction chamber which diverges towards the metering channel, thus enabling gradual filling of the space between the diverging surfaces, essentially forming a capillary pump. At the same time, it is possible to maintain a substantially flat, horizontal orientation of the filtration membrane, which facilitates integrating the filtration membrane in a chamber construction to protect a blood sample from evaporation and contamination during plasma extraction. Preferably, the hydrophilic floor is the floor of a fluid connector extending between the extraction chamber and the metering channel.

In one embodiment, the fluid connector has a maximum height and a minimum height which is smaller than the maximum height of the extraction chamber.

In a fifth aspect of the present disclosure, there is provided a multilayer microfluidic device configured to sample, meter and collect a metered volume of body fluid for analysis by means of capillary transport, wherein the device comprises: an inlet section for receiving a body fluid sample, the inlet section comprising an inlet port and is configured to transport and access the sample to a flat, laterally extending filtration membrane; a metering section, comprising an extraction chamber and a metering channel, the extraction chamber being configured to receive an extracted body fluid from the filtration membrane and arranged in fluid communication with the metering channel; and an outlet section configured to receive and collect a metered volume of body fluid from the metering channel, the outlet section comprising a capillary means for collection of the metered volume of body fluid wherein a roof of the extraction chamber is defined by a flat lower surface of the filtration membrane, and a floor of the extraction chamber is continuous with a floor of the metering channel and extends at an acute angle from the lower surface of the filtration membrane, and wherein the floor of the extraction chamber is inclined with respect to the floor of the metering channel to create a slope.

By means of the inclined floor of the extraction chamber it is possible to achieve a wedge-shaped extraction chamber which diverges towards the metering channel, thus enabling gradual filling of the space between the diverging surfaces, essentially forming a capillary pump. At the same time, it is possible to maintain a substantially flat, horizontal orientation of the filtration membrane, which facilitates integrating the filtration membrane in a chamber construction to protect a blood sample from evaporation and contamination during plasma extraction.

In one embodiment, the device comprises from the bottom to the top: a bottom layer; a hydrophilic floor layer forming the floor of the extraction chamber and the metering channel; and a support structure for the floor layer, wherein the support structure is arranged between the bottom layer and the floor layer such that a first part of the floor layer is supported on the support structure to contact the filtration membrane, and wherein a second part of the floor layer is supported on the bottom layer to form the acute angle between the filtration membrane and the floor layer in order to obtain an extraction chamber with a height gradually increasing towards the metering channel. By means of the layer construction, assembly of the device is facilitated to enable scalable mass manufacturing.

In one embodiment, the device comprises at least five layers selected from: the bottom layer; the support structure; the floor layer; a channel structure layer configured to accommodate the metering section; and a cover layer providing a flat roof surface for the metering channel.

In one embodiment, the floor layer comprises a slot delimiting a tongue portion which forms the floor of the extraction chamber, and wherein a free end of the tongue portion is supported on the support structure. Preferably, the slot is substantially C-shaped and the tongue portion is substantially circular or substantially square. By means of the slot, a desired shape of the tongue portion to form the floor of the extraction chamber can easily be cut, e.g., be adapted to the shape of the filtration membrane.

In one embodiment, the floor layer comprises an opening forming an outlet port of the outlet section.

In one embodiment, the bottom layer comprises a first opening substantially corresponding to the size of the extraction chamber and a second opening arranged to accommodate the capillary means.

In one embodiment, the channel structure layer comprises an opening arranged to accommodate the support structure, the floor of the extraction chamber and an outlet port of the outlet section, preferably said channel structure layer further comprises a slot forming side walls of the metering channel.

In one embodiment, the cover layer comprises an opening substantially corresponding to the size of the extraction chamber, and wherein the lower surface of the filtration membrane is positioned thereon.

The openings in the different layers accommodate the different structures forming the microfluidic device, enabling the multilayer construction.

In one embodiment, the cover layer has a first side facing the channel structure layer with a hydrophilic surface and a second, opposite side with an adhesive surface. The hydrophilic surface thus forms the roof of the metering channel, and the adhesive surface enables assembly of additional layers on top of the cover layer.

In one embodiment, the device further comprises at least one additional layer attached to the second side of the cover layer for assembling the inlet section and a device housing.

Additionally, the fifth aspect of the present disclosure relates to a method of manufacturing a microfluidic device by lamination of foil layers, comprising the steps of: providing a substrate as a bottom layer of the device; assembling a support structure on the bottom layer; providing a floor layer with a hydrophilic upper surface and assembling the floor layer on the bottom layer such that a first part of the floor layer is supported on the support structure and a second part of the floor layer is supported on the bottom layer, wherein the first part of the floor layer is inclined with respect to the second part to create a slope; providing a channel structure layer configured to accommodate a metering section and assembling the channel structure layer on the channel floor layer; providing a cover layer and assembling the cover layer on the channel structure layer; and assembling a filtration membrane in a horizontal position to rest on the cover layer, thereby creating an extraction chamber with the first part of the floor layer as a floor.

By means of the manufacturing method, scalable mass production of a multi-layered microfluidic device with a wedge-shaped extraction chamber is enabled.

In one embodiment, the method further comprises forming a slot in the floor layer to delimit a tongue portion which forms the first part, and assembling the floor layer on the bottom layer such that a free end of the tongue portion is supported on the support structure.

In one embodiment, the floor layer comprises an opening forming an outlet port of the outlet section.

In one embodiment, the bottom layer comprises a first opening substantially corresponding to the size of the extraction chamber and a second opening arranged to accommodate the capillary means.

In one embodiment, the channel structure layer comprises an opening arranged to accommodate the support structure, the floor of the extraction chamber and an outlet port of the outset section.

In one embodiment, the cover layer has a first side facing the channel structure layer with a hydrophilic surface and a second, opposite side with an adhesive surface.

In one embodiment, the method further comprises assembling at least one additional layer on the cover layer and subsequently assembling an inlet section and a housing on the at least one additional layer.

In a sixth aspect of the present disclosure, there is provided a microfluidic device configured to sample, meter and collect a metered volume of body fluid for analysis by means of capillary transport, wherein the device comprises: an inlet section, for receiving a body fluid sample, the inlet section comprising an inlet port arranged to receive a supply of body fluid; a metering function configured to receive body fluid from the inlet section and comprising a first channel; and a sequent section configured to receive the body fluid from the metering function and comprising a second channel, wherein the first channel comprises a capillary stop valve configured to interrupt or reduce flow of the body fluid therethrough, and a means for visual inspection arranged adjacent to the capillary stop valve, wherein a geometry and/or dimension of the inlet port is configured such that when the supply of body fluid to the inlet port is removed, the Laplace pressure of a body fluid meniscus at the inlet port is higher than a threshold pressure of the capillary stop valve.

By configuring the geometry and/or dimension of the inlet port, a desired curvature of the meniscus of the body fluid, which sticks to the inlet port when the supply of body fluid is removed, can be achieved. In one embodiment, the body fluid is blood from a finger prick which is applied to the inlet port. The curvature of the meniscus in turn determines the Laplace pressure induced by the surface tension on the liquid. By selecting a geometry and/or dimension of the inlet port in such a way that the Laplace pressure on the body fluid at the inlet port is higher than the threshold pressure of the capillary stop valve, this will lead to bursting of the capillary stop valve when the supply of body fluid (e.g. a blood droplet on the finger) is removed to allow the body fluid to flow from the first channel to the second channel. This may be used to meter the volume of the body fluid before it flows into the second channel. The user can check the level of filling in the means for visual inspection to ensure that a sufficient amount has been supplied.

In one embodiment, the capillary stop valve is selected from at least one of a part of the first channel with altered hydrophilicity and/or a part of the first channel with changed dimensions. The hydrophilicity and/or dimension of the first channel may be configured to achieve the desired threshold or burst pressure of the capillary stop valve. Preferably, the capillary stop valve is formed by an abrupt increase in height in the first channel.

In one embodiment, the sequent section comprises at least one porous medium for receiving or collecting body fluid from the first channel. Thus, a sample of body fluid may be collected in a simple and efficient manner.

In one embodiment, a height ratio of the first channel to the second channel is at least 1.1:1, preferably at least 2:1. The difference in height ensures continued capillary transport from the first channel to the second channel.

In one embodiment, a surface surrounding the inlet port is hydrophobic. The hydrophobic surface aids in forming a droplet of the body fluid which sticks to the inlet port, thereby increasing the Laplace pressure.

In one embodiment, the metering function is a pre-metering function of blood and the first channel is a pre-metering channel arranged in fluid communication with a filtration membrane and an extraction chamber configured to receive body fluid from the filtration membrane and to transport it to and fill a plasma metering channel. By means of the filtration membrane, the extraction chamber and the plasma metering channel, the device is further configured to autonomously separate, meter and collect plasma from blood, preferably in a capillary means arranged in fluid communication with the plasma metering channel.

In one embodiment, the device further comprises a pinch-off means configured to separate the metered volume of body fluid, wherein the pinch-off means comprises at least one air vent arranged in a part of the extraction chamber with a maximum height. By means of the air vent, an effective separation of the metered volume from the remaining volume of body fluid is achieved.

In one embodiment, the pinch-off means comprises a pinch-off region in fluid communication with the at least one air vent and arranged adjacent the part of the extraction chamber with the maximum height and surrounded by areas with lower height. Preferably, at least one area surrounding the pinch-off region has a height lower than a height of the plasma metering channel. The surrounding areas of lower height lead to a reduction of the capillary pressure in the pinch-off region, thus promoting introduction of an air bubble.

In one embodiment, the device further comprises a fluid connector extending between the extraction chamber and the plasma metering channel, and an air vent. The air vent may be arranged adjacent to, or at the position where the fluid connector meets the plasma metering channel. Preferably, the air vent is arranged at the entrance of the plasma metering channel and is configured as an orifice to ambient air with a cross-sectional area equal to or greater than the size of the cross-sectional area of the plasma metering channel. The air vent is thus placed in a location of the device with low capillary pressure, optimal for introducing an air bubble downstream of the extraction chamber and upstream of the plasma metering channel to separate the metered volume of body fluid.

In one embodiment, the fluid connector has a different dimension than the plasma metering channel, the dimension being selected from one or more of height, width and length.

In one embodiment, a maximum height of the extraction chamber is lower than the height of the plasma metering channel.

In one embodiment, the extraction chamber is substantially wedge-shaped with a gradually increasing height, wherein a roof of the extraction chamber is defined by a flat lower surface of the filtration membrane, and wherein a hydrophilic floor of the extraction chamber extends at an acute angle from a contact with the filtration membrane towards the plasma metering channel. By means of the acute angle between the filtration membrane and the floor of the extraction chamber, it is possible to achieve a wedge-shaped extraction chamber which diverges towards the plasma metering channel, thus enabling gradual filling of the space between the diverging surfaces, essentially forming a capillary pump. At the same time, it is possible to maintain a substantially flat, horizontal orientation of the filtration membrane, which facilitates integrating the filtration membrane in a chamber construction to protect a blood sample from evaporation and contamination during plasma extraction.

Additionally, the sixth aspect of the present disclosure relates to a method for sampling, transporting and collecting a metered volume of body fluid for analysis by means of capillary transport in a microfluidic device, the method comprising the steps of: manually applying a supply of body fluid to an inlet port of the device; filling a first channel arranged in fluid communication with inlet port with body fluid by means of capillary pressure, wherein the first channel comprises a capillary stop valve configured to interrupt or reduce flow of the body fluid therethrough; visually inspecting the first channel for correct filling; removing the supply of body fluid to the inlet port, wherein a geometry and/or dimension of the inlet port is configured such that when the supply of body fluid to the inlet port is removed, the Laplace pressure of a body fluid meniscus at the inlet port is higher than a threshold pressure of the capillary stop valve, whereby the capillary stop valve admits flow of the body fluid therethrough; and admitting a metered volume of body fluid to be transported to a porous medium arranged in fluid communication with the first channel.

In one embodiment, the capillary stop valve is selected from at least one of a part of the first channel with altered hydrophilicity; a part of the first channel with changed dimensions.

In one embodiment, the method further comprises collecting the metered volume of body fluid in the porous medium acting as a capillary means.

The method facilitates sampling of body fluid by enabling the user to supply a sufficient amount of body fluid before the body fluid is admitted to continue to flow through the device for collection in the porous medium.

In a seventh aspect of the present disclosure, there is provided a microfluidic device configured to sample, meter and collect a metered volume of body fluid for analysis by means of capillary transport with means to disconnect a metered volume from the remaining body fluid beyond filtration membrane for removing cells, such as red blood cells. The device comprises an inlet section, comprising an inlet port for receiving a sample of body fluid, the inlet section being configured to transport the sample to a filtration membrane. The device further comprises a metering section comprising an extraction chamber arranged to receive extracted body fluid from the membrane and a metering channel. The device also comprises an outlet section configured to receive, transport, and collect a volume of filtered body fluid from the metering channel in a capillary means. The metering section further comprises a pinch-off means configured to separate a metered volume of filtered body fluid in the metering channel from remaining body fluid in the extraction chamber, wherein the pinch-off means comprises at least one air vent arranged in a part of the extraction chamber with the maximum height. By means of the air vent, an effective separation of the metered volume from the remaining volume of body fluid is achieved.

In one embodiment, the pinch-off means comprises a pinch-off region in fluid communication with the at least one air vent, arranged adjacent an entrance to the metering channel, wherein the pinch-off region comprises a height reducing element with a height lower than the maximum height of the extraction chamber. Preferably, the extraction chamber comprises a part with gradually increasing height, a part with a height reducing element and a part with a maximum extraction chamber height in fluid communication with the metering channel. The height reducing element ensures that the pinch-off region has a higher height than the adjacent part of the extraction chamber, thus reducing the capillary pressure in the pinch-off region to promote introduction of an air bubble.

In one embodiment, the extraction chamber is substantially wedge-shaped, wherein a roof of the extraction chamber is defined by flat lower surface of the filtration membrane, and wherein a hydrophilic floor of the extraction chamber extends at an acute angle from a contact with the filtration membrane towards the metering channel. By means of the acute angle between the filtration membrane and the floor of the extraction chamber, it is possible to achieve a wedge-shaped extraction chamber which diverges towards the metering channel, thus enabling gradual filling of the space between the diverging surfaces, essentially forming a capillary pump. At the same time, it is possible to maintain a substantially flat, horizontal orientation of the filtration membrane, which facilitates integrating the filtration membrane in a chamber construction to protect a blood sample from evaporation and contamination during plasma extraction. Preferably, the maximum height of the plasma extraction chamber exceeds the height of the metering channel.

In one embodiment, at least one part of the extraction chamber surrounding the pinch-off region has a height lower than the height of the metering channel. The surrounding areas of lower height lead to a reduction of the capillary pressure in the pinch-off region, thus promoting introduction of an air bubble In one embodiment, the device comprises a through-hole in the height reducing element to prevent liquid from pinning in the extraction chamber.

In one embodiment, the metering section comprises an extraction chamber with a part with gradually increasing height, a part with the height reducing element and a part with a maximum extraction chamber height arranged in fluid communication with the metering channel.

In one embodiment, the device comprises an inlet section comprising an inlet port and a channel system; a filtration membrane configured to separate plasma from blood, wherein the inlet section and the channel system are configured to transport the sample of body fluid to, and to distribute it across the filtration membrane with a stepwise or gradually increasing capillarity from the inlet section to the filtration membrane along with features as outlined in preceding aspects of the present disclosure, such as the second aspect.

In one embodiment, the device comprises a metering channel having an outlet part with a dimensional change configured to cause a fluid front meniscus of the separated metered volume of body fluid, when transported to the outlet section, to assume a shape which substantially conforms to the surface geometry of the capillary means with features as outlined in preceding aspects of the present disclosure, such as the third aspect.

In one embodiment, the device comprises an outlet section with a conformable hydrophilic porous bridge element insertable into a bridge cavity in such a way that the bridge cavity is substantially filled with features as outlined in preceding aspects of the present disclosure, such as the fourth aspect.

In one embodiment, the device is a multi-layered device with wedge shaped extraction chamber wherein a floor of the extraction chamber is continuous with a floor of the metering channel and extends at an acute angle from the lower surface of the filtration membrane, and wherein the floor of the extraction chamber is inclined with respect to the floor of the metering channel to create a slope. The device may be manufactured using a multilayer arrangement and a method with features as outlined in preceding aspects of the present disclosure, such as the fifth aspect.

In one embodiment, the device comprises an inlet part with pre-metering function including visual inspection means and a capillary stop valve with features as outlined in preceding aspects of the present disclosure, such as the sixth aspect.

In an eighth aspect of the present disclosure, there is provided a microfluidic device configured to sample, meter and collect a metered volume of body fluid for analysis by means of capillary transport with means to disconnect a metered volume from the remaining body fluid beyond filtration membrane for removing cells, such as red blood cells. The device comprises an inlet section, comprising an inlet port for receiving a sample of body fluid, the inlet section being configured to transport the sample to a filtration membrane. The device further comprises a metering section comprising an extraction chamber arranged to receive extracted body fluid from the membrane, a metering channel, and a fluid connector arranged between the extraction chamber and the metering channel and a pinch-off means comprising at least one air vent configured to introduce at least one air bubble to separate a metered volume. By means of the air vent, an effective separation of the metered volume from the remaining volume of body fluid is achieved In one embodiment, the extraction chamber has a gradually increasing height to a maximum value, that is less than the height of the metering channel.

In one embodiment, the fluid connector has different dimensions than the metering channel preferably such a dimension is selected from one or more of height, width and/or length.

In one embodiment, the fluid connector has a gradually increasing height to the maximum height of the metering channel. In a special embodiment of the fluid connector, it is arranged with a height lower than the maximum height at entrance from the extraction chamber and the height gradually increases to the height of metering channel.

In one embodiment, device has at least one air vent is located in the metering section where the height exceeds the maximum height of the extraction chamber. In one embodiment, the at least one air vent is located adjacent to, or at the position where the fluid connector meets the metering channel. In another embodiment, the at least one air vent is located where the height is at a maximum.

In one embodiment, the at least one air vent is located at the entrance of the metering channel and is configured with an orifice to ambient air with a cross-sectional area of at least the size of the cross-sectional area of the metering channel.

In one embodiment, the fluid connector joins the metering channel at an acute angle or with a curve.

In one embodiment, the extraction chamber is substantially wedge-shaped, wherein a roof of the extraction chamber is defined by flat lower surface of the filtration membrane, and wherein a hydrophilic floor of the extraction chamber extends at an acute angle from a contact with the filtration membrane towards the metering channel. By means of the acute angle between the filtration membrane and the floor of the extraction chamber, it is possible to achieve a wedge-shaped extraction chamber which diverges towards the metering channel, thus enabling gradual filling of the space between the diverging surfaces, essentially forming a capillary pump. At the same time, it is possible to maintain a substantially flat, horizontal orientation of the filtration membrane, which facilitates integrating the filtration membrane in a chamber construction to protect a blood sample from evaporation and contamination during plasma extraction. Preferably, the maximum height of the plasma extraction chamber exceeds the height of the metering channel.

Preferably, extraction chamber, the fluid connector and the metering channel have the same hydrophilic floor.

In one embodiment, the device comprises an inlet section comprising an inlet port and a channel system; a filtration membrane configured to separate plasma from blood, wherein the inlet section and the channel system are configured to transport the sample of body fluid to, and to distribute it across the filtration membrane with a stepwise or gradually increasing capillarity from the inlet section to the filtration membrane along with features as outlined in preceding aspects of the present disclosure, such as the second aspect.

In one embodiment, the device comprises a metering channel having an outlet part with a dimensional change configured to cause a fluid front meniscus of the separated metered volume of body fluid, when transported to the outlet section, to assume a shape which substantially conforms to the surface geometry of the capillary means with features as outlined in preceding aspects of the present disclosure, such as the third aspect.

In one embodiment, the device comprises an outlet section with a conformable hydrophilic porous bridge element insertable into a bridge cavity in such a way that the bridge cavity is substantially filled with features as outlined in preceding aspects of the present disclosure, such as the fourth aspect.

In one embodiment, the device is a multi-layered device with wedge shaped extraction chamber wherein a floor of the extraction chamber is continuous with a floor of the metering channel and extends at an acute angle from the lower surface of the filtration membrane, and wherein the floor of the extraction chamber is inclined with respect to the floor of the metering channel to create a slope. The device may be manufactured using a multilayer arrangement and a method with features as outlined in preceding aspects of the present disclosure, such as the fifth aspect.

In one embodiment, the device comprises an inlet part with pre-metering function including visual inspection means and a capillary stop valve with features as outlined in preceding aspects of the present disclosure, such as the sixth aspect.

BRIEF DESCRIPTION OF THE DRAWINGS

The present disclosure is now described, by way of example, with reference to the accompanying drawings, in which:

FIGS. 3A-3D show a capillary force driven microfluidic device with volume control of applied sample fluid.

FIGS. 15A-15F generally demonstrate embodiments of a microfluidic device having a channel system with stepwise increased capillarity that can determine that a sufficient body fluid volume is introduced.

DESCRIPTION OF EMBODIMENTS

Figure 1:
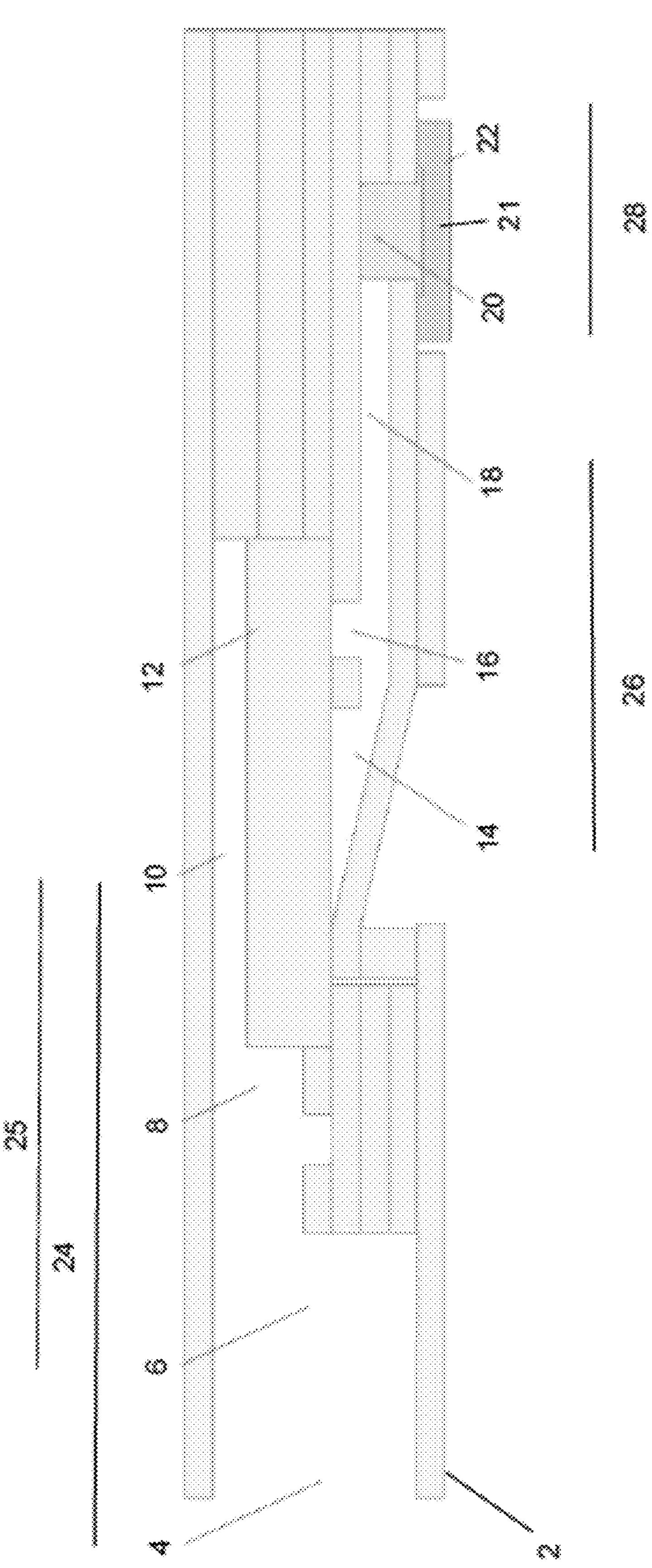
FIG. 1 shows a general outline of a microfluidic device adapted to collect blood plasma from whole blood by a finger prick, transport and separate the blood and collect a defined volume of plasma from the blood.

The following section provides detailed descriptions of microfluidic devices configured to sample and collect a metered volume of body fluid for analysis by means of capillary transport, according to the embodiments of the present disclosure. In the drawing figures, like reference numerals designate identical or corresponding elements throughout the several figures. It will be appreciated that these figures are for illustration only and do not in any way restrict the scope of the present disclosure

Example 1—the Microfluidic Device

FIG. 1 shows an exemplary embodiment of a microfluidic device adapted to collect blood plasma from whole blood by a finger prick, transport and separate the blood and collect a defined volume of plasma from the blood. In a broad overview the system comprises the following components which are arranged in the direction of flow through the system as shown in FIG. 1:

An inlet section 24 comprising
an inlet port 4,
a channel system 25,
a first channel 6, also called pre-metering application channel
a second channel 8, also called intermediate channel
a third channel 10, also called filtration channel
a filtration membrane 12,
a metering section 26 comprising,
an extraction chamber 14,
a vent/pinch-off structure 16,
a plasma metering channel 18,
an outlet section 28 comprising,
an outlet port 21 (with a bridging capillary element 20), and
a capillary means 22.

Figures 2A, 2B, 2C, 2D, 2E, 2F, 2G, 2H:
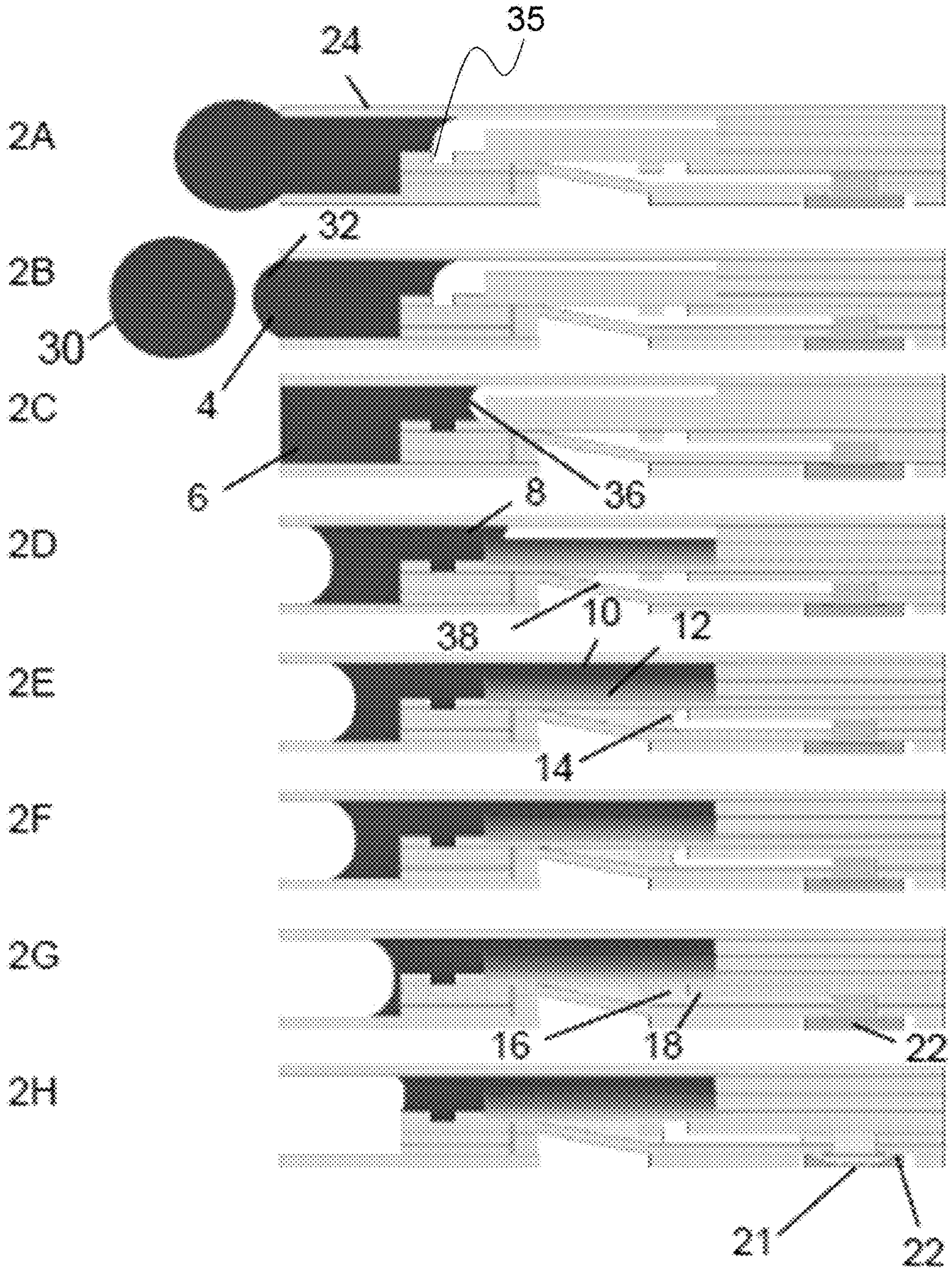
FIGS. 2A-2H show plasma sampling in several consecutive fluid handling steps.

The plasma sampling works in several consecutive fluid handling steps that are described in FIGS. 2A-2H. As an overview, the figures show the following: FIG. 2A: the filling of the first, pre-metering application, channel 6 of the inlet section 24; FIG. 2B: the removal of the blood supply 30 after the front meniscus 36 of the blood reaches the capillary stop valve 35, leading to forming of a convex rear meniscus 32 of the blood sticking to the inlet port 4; FIG. 2C: Laplace pressure has pushed the concave front meniscus 36 of the blood liquid across the capillary stop valve 35; FIG. 2D: flow through the second, intermediate, channel 8 to the filtration membrane 12, simultaneous filling of the filtration membrane, emptying of the pre-metering application channel 6 and initiation of the plasma extraction; FIG. 2E: filling of the third, filtration, channel 10; FIG. 2F: continuous filtration into the extraction chamber 14; FIG. 2G: filling of the plasma metering channel 18; and FIG. 2H: absorption of the metered plasma volume into the capillary means 22 with a bubble entry at a vent/pinch-off structure 16.

As shown in FIG. 2A, blood 30 is filled via the inlet port 4 into the pre-metering application channel 6. When the pre-metering application channel 6 is filled entirely, the supply of blood to the inlet port is manually interrupted, thereby metering a defined volume, see FIG. 2B. The intermediate channel 8 transports the blood from the pre-metering application channel 6 towards the filtration channel 10 and the filtration membrane 12, see FIG. 2C.

The capillary pressure in the intermediate channel 8 thus needs to be higher than the capillary retention pressure that pins the liquid to the inlet port, so that the liquid can be pumped from the pre-metering application channel 6 to the filtration channel 10/filtration membrane 12. A higher capillary pressure in the intermediate channel 8 is also beneficial for preventing bubbles at the contact of second channel and filtration membrane 12 where a steep increase in capillary pressure can otherwise introduce air bubbles into the intermediate channel 8. Air bubbles can potentially interrupt the capillary action on the fluid plug that moves through the system and as a result stop the fluid operations. Once the blood meniscus 32 contacts the filtration membrane/the third channel 10, filling of these two compartments occurs in parallel and according to the capillary forces in either of the compartments, see FIGS. 2D-2E.

Since the third channel 10 and the membrane 12 are arranged in parallel, typically the filtration membrane fills first due to the higher capillary pressure within the filtration membrane. Once the void volume of the membrane is filled with blood/plasma, the third channel 10 starts/continues filling. The filtration membrane 12 has a capillary gradient with pore sizes from several tenths of micrometers on the blood receiving side to 2-3 micrometers on the plasma extraction side. As soon as the plasma reaches the lower surface of the filtration membrane 12, the extraction of plasma into the extraction chamber 18 occurs, due to the high capillary pressure at the intersection of plasma filtration membrane 18 and hydrophilic bottom substrate 38, see FIG. 2D. The diverging space between the membrane 12 and the hydrophilic bottom substrate 38 fills gradually with plasma because the capillary pressure in the extraction chamber 14 is substantially higher than the retention pressure in the pre-metering application channel 6, see FIGS. 2D-2F.

Once the plasma meniscus reaches the inlet of the plasma metering channel 18, the plasma continues to flow into the plasma metering channel 18 driven by the capillary pressure inside the channel 18, see FIG. 2G. The capillary pressure inside the plasma metering channel 18 needs to be substantially larger than the retention capillary pressure in the pre-metering application channel 6 to allow plasma filtration through the membrane 12. Once the plasma metering channel 18 is filled entirely and the meniscus reaches the outlet port 21, a sudden increase in capillary pressure leads to the absorption of plasma through the outlet port 21 into the capillary means 22, see FIG. 2H.

Due to the high flow resistance of blood in the filtration membrane, absorption of fluid upstream of the filtration membrane is minimal. Instead, a vent structure/pinch-off structure 16 downstream of the filtration membrane offers a lower resistance for a bubble entry which leads to a pinch-off and the metering of the plasma volume. Since the system presented is based on the construction of foils which leads to liquid-air interfaces in the downstream capillary system, a bubble entry is possible at several points. Thus, it is important to consider the capillary retention pressure in the downstream capillary system in order to have a controlled and repeatable bubble entry that enables the desired precision in metering the volume of the plasma. Plasma absorption through the outlet port continues until the entire plasma metering channel is emptied and the volume is transferred into the capillary substrate.

Since there is no safety mechanism to prevent a second fill cycle of the plasma metering channel when excessive blood is present at the filtration membrane, it is crucial to have a well-defined input volume. The input volume is directly correlated with the dead volume of the system and the plasma output volume of the system. For this purpose, a pre-metering application channel 6 is introduced instead of applying blood directly on the membrane.

Another reason for introducing a pre-metering application channel 6 is that the required a total blood volume of blood is approximately 70 μl. Since it is intended that users will apply blood without any measurement device such as a pipet, and instead directly from a finger prick, the pre-metering application channel 6 allows collection of several consecutive drops and giving feedback to the user about the fill status of the device. Once sufficient blood has been applied to system, an indicator area will display the successful filling. The pre-metering application channel 6 is also well integrated with the third channel which has the purpose of distributing blood homogenously across the membrane and limits evaporation of water from the blood during the filtration.

Example 2—Pre-Metering

A capillary force driven microfluidic device with volume control of applied sample fluid is described generally in FIGS. 3A-3D. The device of FIGS. 3A-3D is configured to collect one or more drops at an inlet port 40 for transportation into a first, pre-metering application, channel 42 with a pre-metering section/compartment. When the pre-metering section has been filled, a fill indicator 44 confirms the fill status to the user so that the supply of liquid to the inlet port 40 can be manually interrupted and a defined volume is trapped in the pre-metering compartment. The pre-metering operation takes place in four steps: (a) application of liquid to the inlet port 40, (b) capillary filling of the pre-metering compartment, (c) reaching of the indicator 44, manual read-out, and (d) removal of excess liquid from the inlet port 40.

FIGS. 3A-3D illustrate this process. FIG. 3A shows that the liquid is applied to the inlet port 40. FIG. 3B shows the capillary filling of the first channel or pre-metering compartment 42. In FIG. 3C shows that the indicator 44 is reached and, manually read out. In FIG. 3D the excess liquid is removed from the inlet port 40.

Since the manual interruption of fluid supply to the inlet takes place with a certain delay, it introduces a time dependent overfill of the defined volume into a second channel or connecting capillary channel, 46. This overfill volume depends on the time period between reaching the indicator window 44 and removing the liquid from the inlet port 42, and the flow rate in the connecting capillary channel 46.

Figures 4A, 4B, 4C, 4D, 4E:
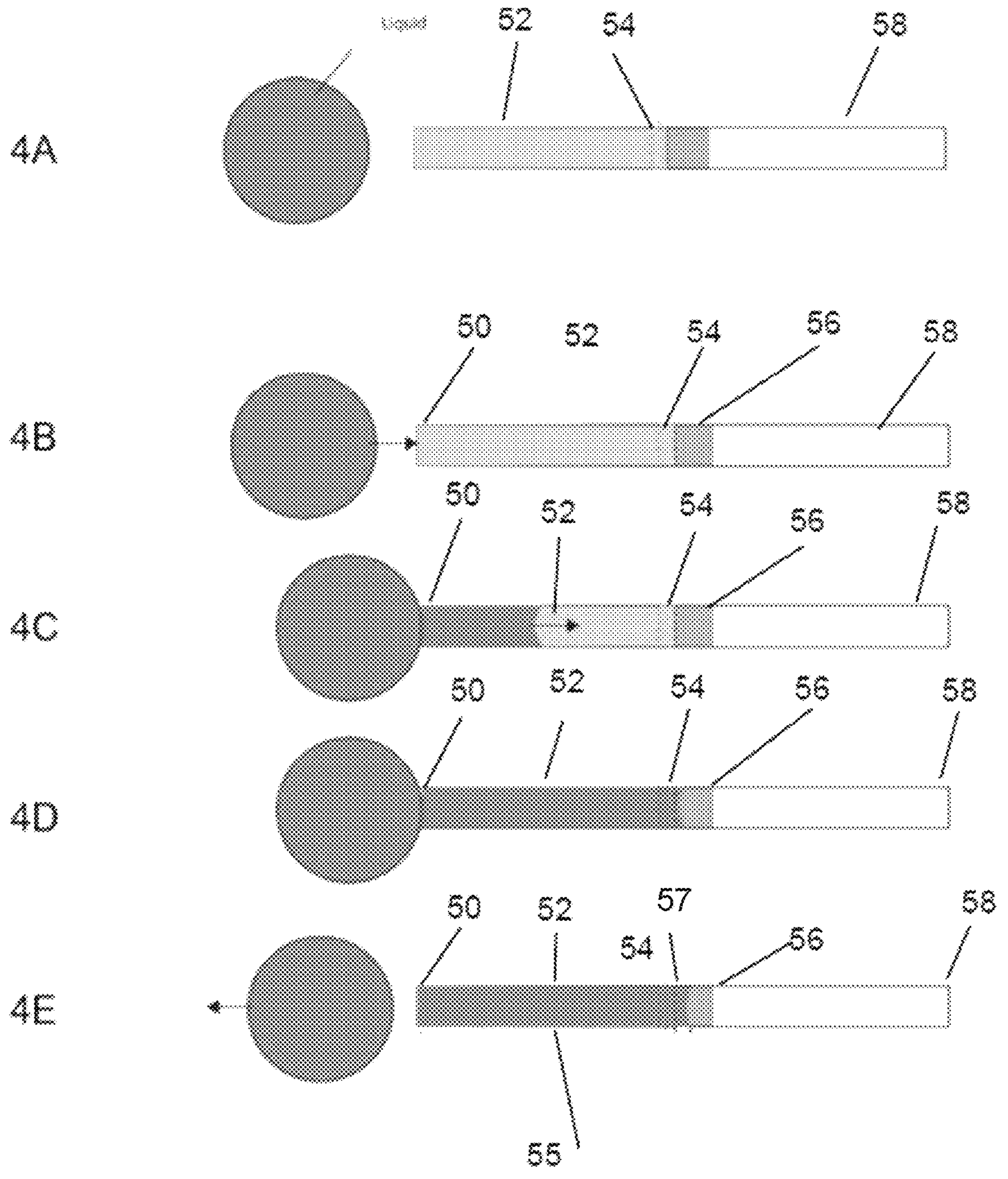
FIGS. 4A-4E show a capillary force driven microfluidic device with volume control of applied sample fluid with microfluidic features introduced between the indicator window and the connecting capillary section.

FIG. 4A shows the components of a capillary system including an inlet port 50, a first channel 52 (also called pre-metering channel), an indicator window 54 and a second channel 58 (also called connecting or sequent capillary channel). Introducing other microfluidic features suitable for capillary driven devices such as a valve or flow reduction gate 56 can help increase the accuracy of the metering. Such microfluidic features can be introduced between the indicator window 54 and the second channel 58, to slow down or stop the flow between the two sections, as shown in FIGS. 4B-4E.

FIGS. 4B-4E illustrate the metering of liquid in a capillary system using a flow reduction gate or a stop valve 56. The flow reduction gate acts in such a way that the speed of the flow is reduced substantially so that, in a given time period (e.g., 3 sec), a smaller volume 57 overflows from the pre-metering channel 52 into the second channel 58 than without a flow reduction gate, such that the amount of fluid applied to the capillary system is substantially equal to the metered volume of fluid 55 in the pre-metering channel 52. For example, flow reduction gates can be implemented by altering the hydrophilic/hydrophobic properties of the microchannel, adjusting the dimensions of the microchannel, or changing the flow resistance of the microchannel.

Stop valves such as dissolvable membrane valves or capillary stop valves bring the flow to a complete halt so that the overfill volume can be minimized. Dissolvable membrane valves can disintegrate when brought into contact with a liquid and can stop the flow for a certain time, before opening the fluid communication to the downstream connecting capillary means. A capillary stop valve acts as a pressure barrier and can be used to completely interrupt the flow in the capillary system until wetting of the valve occurs or an additional hydraulic pressure pushes the liquid across the pressure barrier. Such a hydraulic pressure can be introduced in different ways, for example by applying a hydrostatic pressure or by a change in the inlet port conditions, e.g., a change in Laplace pressure/capillary pressure at the inlet.

The operation of manual removal of excess liquid from the inlet port can be used to introduce such a change in Laplace pressure that leads to a burst of the stop valve initiating the flow into the second channel. Dimensions and surface properties of the overall capillary system are selected to allow a transport of liquid from the metering section into the connecting capillary section. Capillary stop valves are not actually closed but create a pressure barrier for the capillary flow which bursts once a certain pressure is applied to the liquid. One speaks about the bursting of the valve rather than opening of the valve as its not physically closed but only closed by means of interrupting the capillary flow. For capillary stop valves, burst pressure is a function of surface energy of the liquid-gas-interface, wettability by the fluid, and the geometric dimensions of the valve. It therefore can be predefined by an appropriate design of the microfluidic structures.

Consequently, the geometry and/or dimension of the inlet port can be configured such that when the supply of body fluid to the inlet port is removed, the Laplace pressure of a body fluid meniscus at the inlet port is higher than a threshold pressure of the capillary stop valve.

Example 3—Sample Volume Control with a Capillary Stop Valve

Figures 5A, 5B, 5C, 5D, 5E, 5F, 5G:
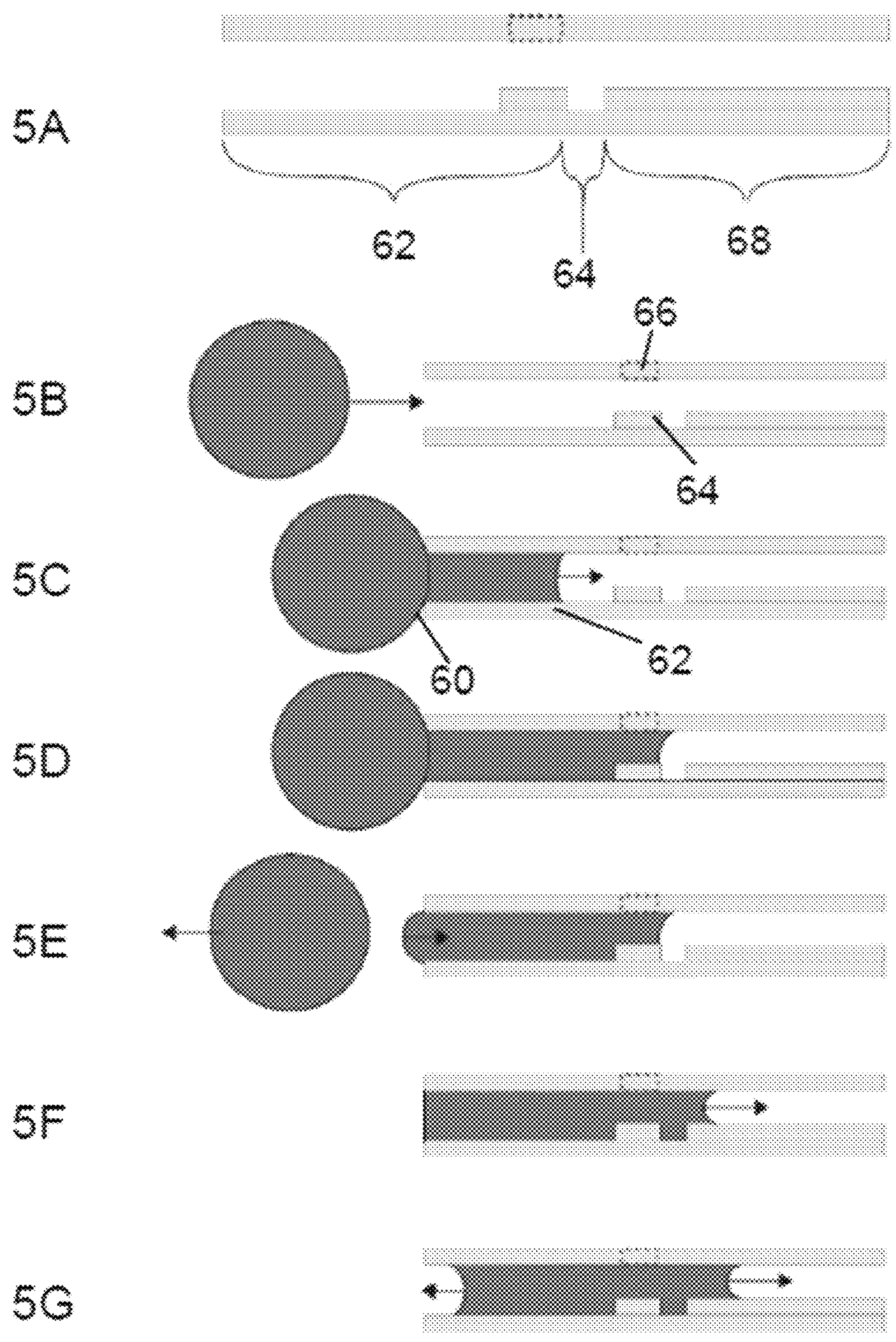
FIGS. 5A-5G show a cross-sectional schematic of a microfluidic device using a capillary stop valve fabricated in lamination technology.
Figures 6A, 6B, 6C, 6D:
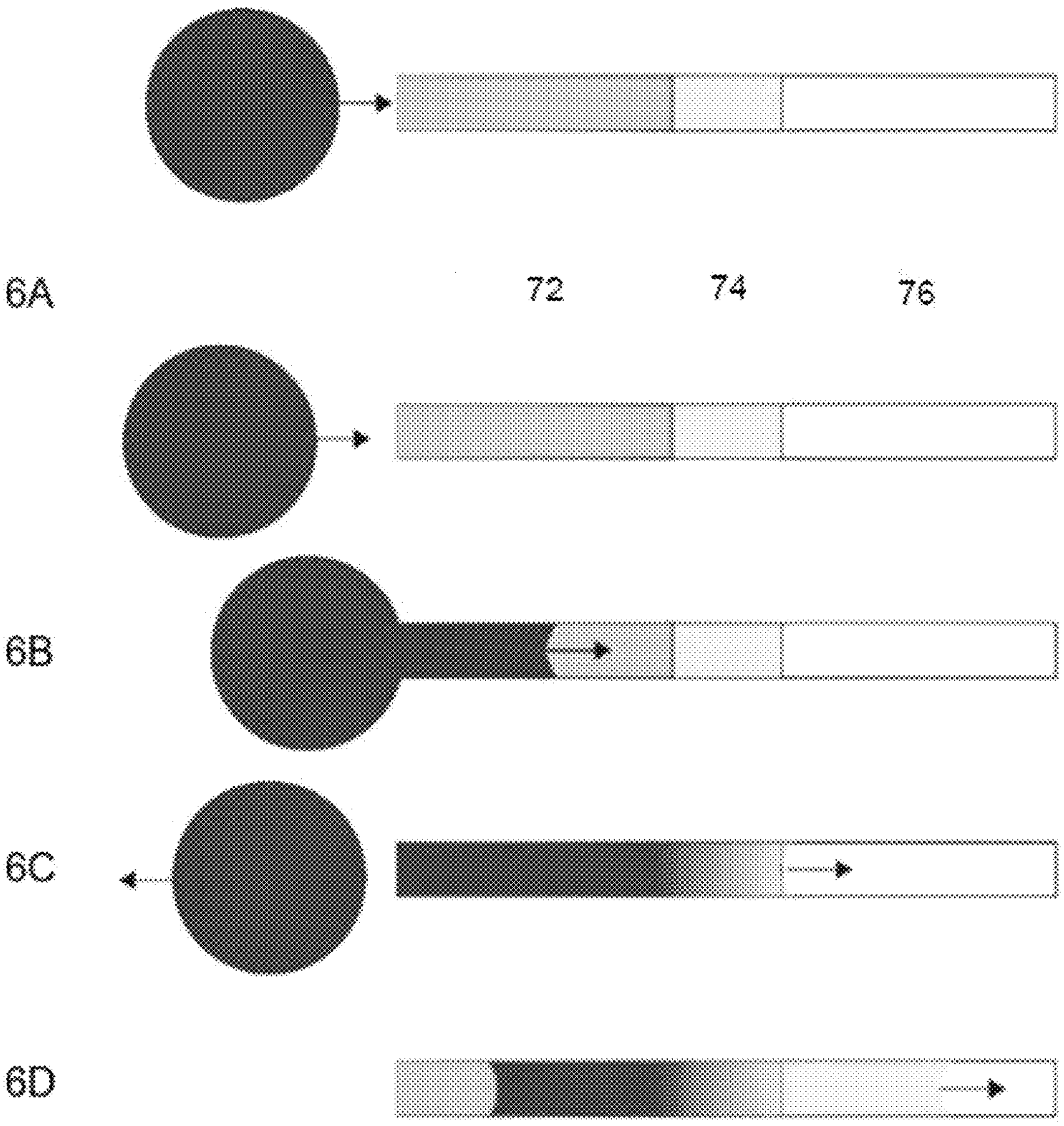
FIGS. 6A-6D show the balancing of capillary pressure in a microfluidic device according to an embodiment of the present disclosure.

FIGS. 5A-5G show an embodiment of a microfluidic device with sample volume control as generally described in Example 2 using a capillary stop valve 64. 5A-5G show a cross-sectional schematic of a microfluidic device using a capillary stop valve fabricated in lamination technology. The device is constructed using structured layers that are laminated together. In FIG. 5A, the cross-section shows an inlet port 60, a metering channel 62, a capillary stop valve 64, the position of an indicator window 66 and a second channel 68. When a drop of liquid contacts the inlet port 60, liquid is sucked into the metering channel 62 of the device until the liquid reaches the capillary stop valve 64 (FIGS. 5B-5D). Separation of the excess fluid from the liquid volume inside the metering channel 62 causes a small amount of liquid to stick to the inlet port 60 outside the metering channel 62.

The curvature of this volume causes the surface tension-induced Laplace pressure on the liquid to push the liquid inside the metering channel 62 across the capillary stop valve 64 as indicated by the arrows, by virtue of being higher than the threshold pressure of the capillary stop valve 64. The liquid then continues to flow into the second channel 68 because the capillary pressure at the front of the liquid flow direction is higher than the capillary retention pressure at the inlet port (FIGS. 5E-5F).

Example 4—Balancing of Capillary Pressure in a Microfluidic Device

FIGS. 6A-6D generally describe balancing of capillary pressure in a microfluidic device according to the present disclosure. The microfluidic device allows for absorption of whole blood into an inlet section, shown as compartment A, 72 and then autonomously filtrates the plasma fraction from whole blood by pumping/transporting the blood through a filtration element (membrane) 74 into a metering section (comprising an extraction chamber and a metering channel) and an outlet section (comprising a capillary means/pump), generally shown as compartment B, 76 in FIG. 6A. All fluid transport in the device is based on capillary pressure. The conditions for successful filtration of plasma require the capillary pressure in Compartment B 76 to be larger than the retention pressure in the Compartment A 72 so that a fluid transport occurs from compartment A to compartment B in light of all frictional forces of the system.

More specifically, the embodiment of the present disclosure comprises several microfluidic elements as described above. Fluid is pumped through the system from the inlet to the outlet forming a fluid plug or column that is pumped through the system using capillary pressure. To allow the continuous flow of the fluid plug through the system, a pressure difference between the capillary pressure at the liquid front flowing towards the outlet and the capillary pressure at the liquid end trailing the fluid plug (retention pressure) needs to be given at any time. The capillary pressure at the meniscus filling into the system varies throughout the filling operation and is defined by the contact angle of the interfacing surfaces, the surface tension of the liquid, and the (smallest) channel/feature dimensions. The capillary retention pressure at the receding end is defined by the same parameters with the difference that the receding contact angle defines the curvature of the liquid-air interfaces and thus the capillary retention pressure. When the microfluidic device is constructed from laminated layers, the capillary height is typically much smaller than the channel width; it predominantly defines the capillary pressure in the different sections. During the application of liquid to the first channel, the liquid is not trapped in a capillary, but freely available in form of a drop or a liquid reservoir of any shape. This allows filling the precedingly described first channel which has the biggest capillary height in the system and thus induces, relatively speaking, the lowest capillary pressure.

Once the application of blood is stopped, the open air-liquid interface that trails the fluid plug is formed and is throughout the filling and filtration operation counteracting the capillary pressure at the liquid front. To allow a continuous capillary flow of the plug through the devices, all compartments/channels that follow the liquid front need to induce a capillary pressure that is substantially larger than the capillary pressure at the trailing end.

Example 5—Capillary Height Changes

Example 5 is a detailed embodiment of the microfluidic device as generally described in Example 4. The microfluidic device in Example 5 is fabricated from a stack of structured foils with changes in capillary height introduced stepwise, except for the wedge slope. A stepwise reduction in the capillary height can be filled without fluid pinning to the step. However, a stepwise increase in the capillary height results in pinning and formation of a capillary stop, which should be prevented to guarantee a continuous operation of the device. These design requirements lead to a stepwise decrease in capillary heights throughout the system with exception of the plasma extraction chamber, where a continuous increase of capillary height allows gradually filling of the wedge structure before stepwise decreasing the capillary height again. An example of the operation of the system can be seen in FIGS. 2A-2H; the relevant capillary dimensions are listed in Table 1.

TABLE 1

Device parameters enabling a continuous operation of the device as shown in FIG. 2A

| Compartment | Capillary height/Capillary feature size |
|---|---|
| First channel | 750 μm |
| Second channel | 300 μm |
| Third channel | ~100 μm |
| Filtration membrane | Porous gradient from 30 μm to 2 μm |
| Extraction chamber | Gradient from 0 μm to 250 μm |
| Plasma metering channel | 150 μm |
| Capillary means | Pore size 5-10 μm |

Examples 6A and 6B below refer to embodiments of the microfluidic device with different solutions to pinch-off the metered volume of body fluid in order to transport correctly metered volume for collection in a capillary means at device's outlet.

Example 6A—Metering 1: Pinch-Off Under the Membrane

This embodiment of the present disclosure relates to a pinch-off structure in a capillary system that allows the separation of a fluid plug into two fluid plugs using capillary force, so that no fluid communication between the two plugs occurs. More specifically it allows the separation of a well-defined plasma volume from a fluid plug consisting of whole blood and plasma.

Pinching-off/separating liquids in a capillary driven system requires the introduction of an air bubble into the system. Air bubbles can be introduced to the system at existing liquid-air interfaces such as vents or other open sections. The wedge structure in the plasma extraction chamber is constructed in a way that due to fabrication constraints, the sealing of the sides of the edge is not possible" However, to allow accurate metering of plasma, the absorption of plasma below the wedge and the bubble entry must be controlled. Due to the microfluidic device's construction, the parts of the wedge structure that have the highest capillary height in the plasma extraction system are located downstream of the plasma separation membrane, making this a suitable point for entering a bubble into the system. In this embodiment of the present disclosure, a pinch-off structure is designed that exploits this point of relatively low capillary retention pressure in the plasma extraction chamber and controls where exactly a bubble can enter the capillary system when the plasma contacts the capillary pump.

FIGS. 7A-7G and 9A-9B both show a pinch-off under the membrane. Pinching off occurs once the plasma front reaches the capillary means and the immediate absorption of plasma from the capillary system is initiated. Since the filtration of plasma through the filter occurs substantially slower than the absorption of plasma from the system, the absorption leads to bubbles growing at the point of least capillary pressure which, in both cases, occur in the section below the filtration membrane. This leads to "necking" in the section of highest capillary height until the fluid plug extending between the plasma third channel and the plasma metering channel collapses and the bubble starts to grow in the plasma metering channel. It is an advantage to create necking and pinch-off under the membrane because the absence of the liquid-solid interfaces on the left and the right side of the necking region prevents corner flow which could otherwise lead to a capillary connection between the two fluid plugs. The corners of a square microchannel have a high capillary pressure which leads to trapping of fluid there that can lead to a remaining connection between the two fluid plugs. Another advantage of pinching off below the plasma filtration membrane is that, before plasma can refill the plasma metering channel, the pinch-off region must be filled a second time. Relatively speaking, the refilling occurs rather slowly since the capillary height here is at its highest level and thus, the capillary pressure is relatively low.

In pinching-off of plasma below the membrane, by narrowing the connection between the plasma extraction chamber and the plasma metering channel, the volume contained in the section designed for pinch-off is reduced. Unwanted absorption of plasma from the section left of the pinch-off region may occur.

The absorption of plasma through the outlet port 21 of the system may occur not only from the pinch-off region 84 next to the inlet of the plasma metering channel 18, but also from different areas below the membrane. This unwanted absorption is reduced by the pinch-off structures 83, 84 shown in FIGS. 7A-7G. The capillary height below the filtration membrane 81 is reduced by means of a height-reducing element 83 in areas where absorption of plasma is undesired and clearly defines a pinch-off region 84, approximately 2 mm×2 mm in surface area, where the capillary height has the highest capillary height (in the plasma system) of 250 μm. On the right side of the pinch-off region 84, the channel cover 80 reduces the capillary height to 150 μm and, on the left side of the pinch-off region 84, the extending structures 83 of the channel cover 80 reduce the capillary height to less than 150 μm. In this way, unwanted absorption of plasma from the wedge-shaped extraction chamber 87 below the membrane 81 is prevented.

In the pinching-off of plasma below the membrane 81, plasma fills from the extraction chamber 87 into the plasma metering channel 18. After connecting to the porous plug 89 at the outlet port 21, absorption of plasma in the plasma metering channel 18 through the outlet port 21 occurs and a neck is formed between the plasma extraction chamber 87 and the plasma metering channel 18. The plasma neck collapses between the third channel and the plasma metering channel separates the two fluid volumes.

Figure 7A:
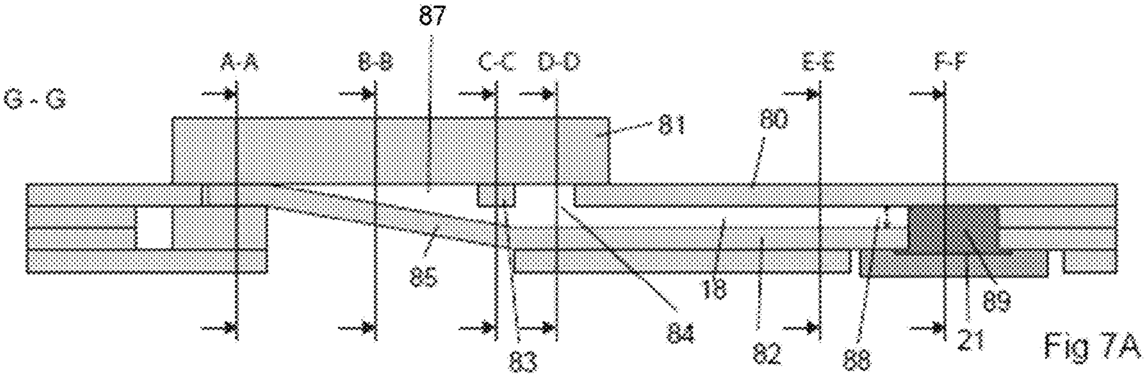
FIGS. 7A-7G show cross-sectional views of a microfluidic device according to one embodiment of the present disclosure illustrating different layers that form a pinch-off region.
Figure 7B:
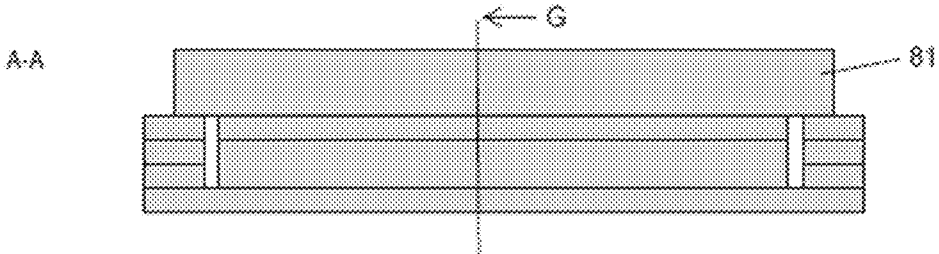
Figure 7C:
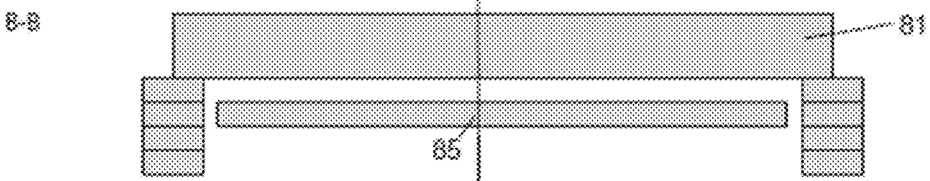
Figure 7D:
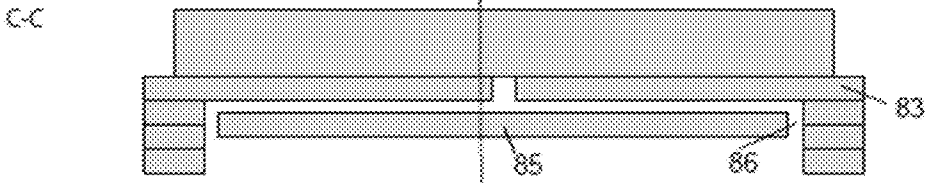
Figure 7E:
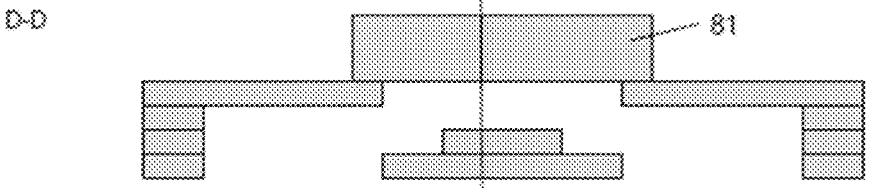
Figure 7F:
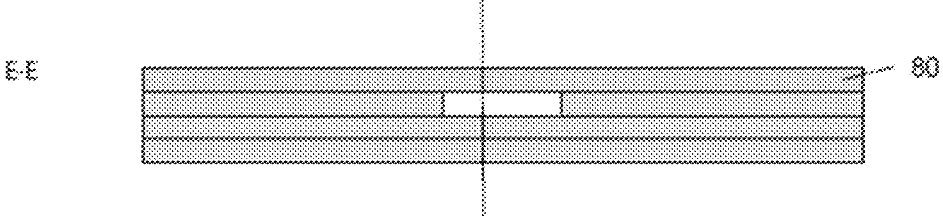
Figure 7G:
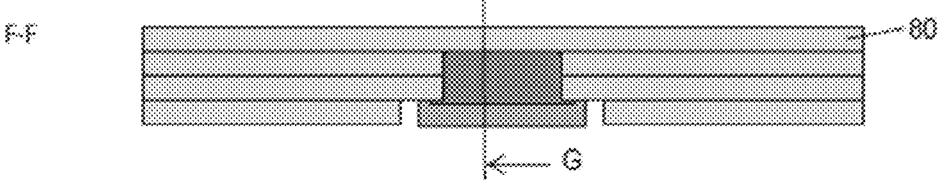

FIG. 7A schematically shows a longitudinal cross-sectional view cut through lines G-G of an embodiment of the microfluidic device with a pinch-off region 84, while FIGS. 7B-7G show the transversal cut-through lines A-A, B-B, C-C, D-D, E-E, and F-F, respectively. FIG. 7F shows the overlap between the bottom 82 of the plasma metering channel 18 and the roof 80 of the plasma metering channel 18, defining the capillary height 88 of the plasma system. The pinch-off region 84 is defined by reducing the capillary height upstream (left in FIG. 7A) and downstream (right in FIG. 7A) of the pinch-off region 84. The pinch-off region has open sidewalls 86 creating a liquid-air interface that is beneficial for bubble entry and prevents corner flow.

Pinch-off under the membrane according to the design shown in FIGS. 7A-7G occurs as follows:

Before wetting the porous plug 89 at the outlet 21, the pinch-off region 84 below the membrane 81 is filled with plasma. The wetting of the porous plug 89 leads to absorption of plasma from the pinch-off region 84 and a neck is formed. Further absorption of plasma from the necking region leads to a collapse of the neck and disconnects the fluid in the plasma extraction chamber 87 from the fluid in the plasma metering channel 18. A bubble then enters the plasma metering channel 18 as the fluid in the channel 18 is absorbed through the outlet port 21 of the device. Refilling of the pinch-off region occurs from the plasma extraction chamber 87 as plasma filtration continues.

Figure 9A:
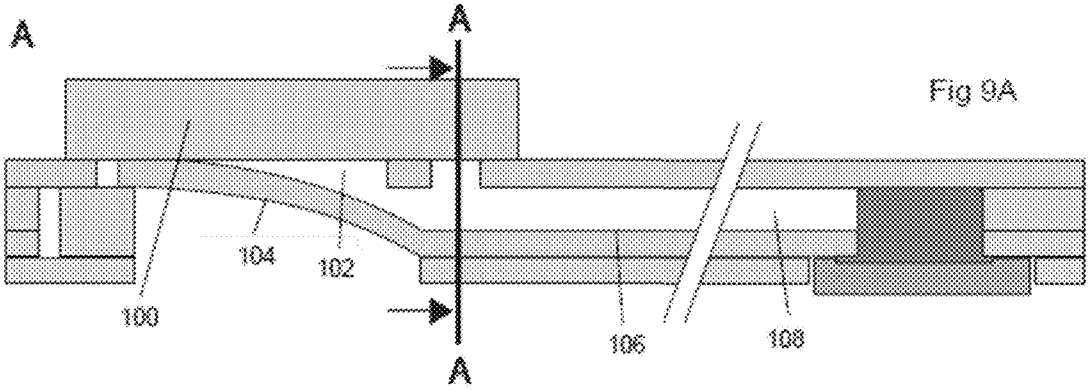
FIGS. 9A-9B show cross-sectional views of a microfluidic device illustrating a pinch-off solution according to one embodiment of the present disclosure.
Figure 9B:
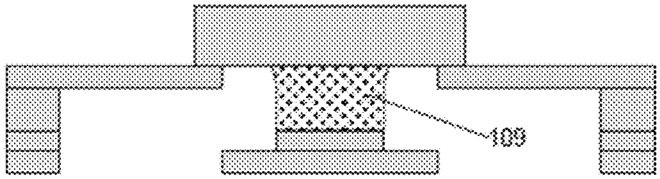

FIG. 9A shows a longitudinal cross-sectional view of an embodiment of the metering 1 solution where the extraction chamber 102 is substantially wedge-shaped and with a horizontally arranged filtration membrane 100 as a roof and slope 104 formed by a hydrophilic floor 106 extending at an acute angle from a contact with the filtration membrane towards the metering channel 108. FIG. 9B shows a transverse cross-sectional view taken along line A-A and illustrates filling of plasma 109 in the pinch-off region prior to pinch-off through introduction of an air bubble.

Example 6B—Metering 2: Using a Pinch-Off Structure Inside the Metering Channel

Figure 8A:
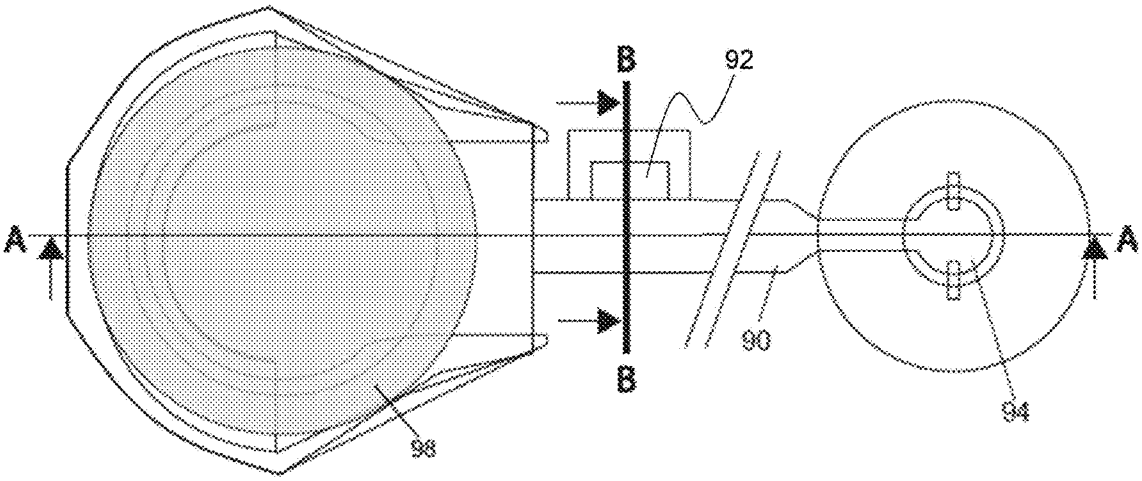
FIGS. 8A-8C show plan and cross-sectional views of a microfluidic device illustrating a pinch-off solution according to one embodiment of the present disclosure.
Figure 8B:
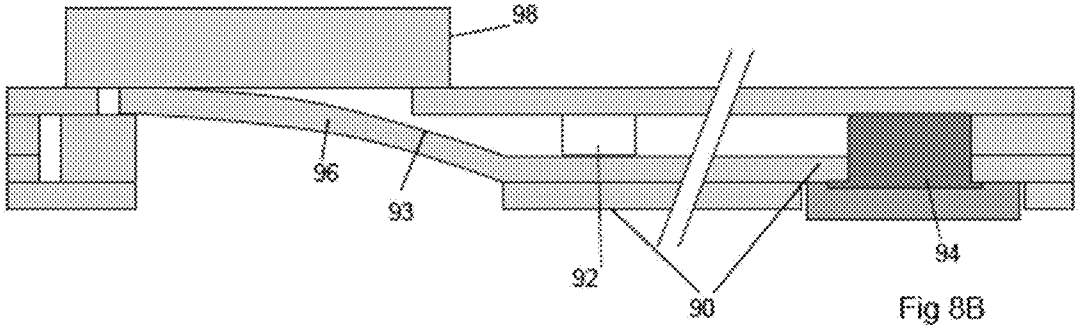
Figure 8C:
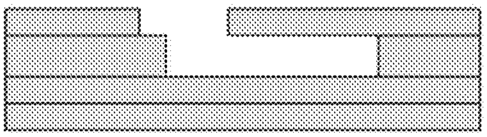
Figure 10A:
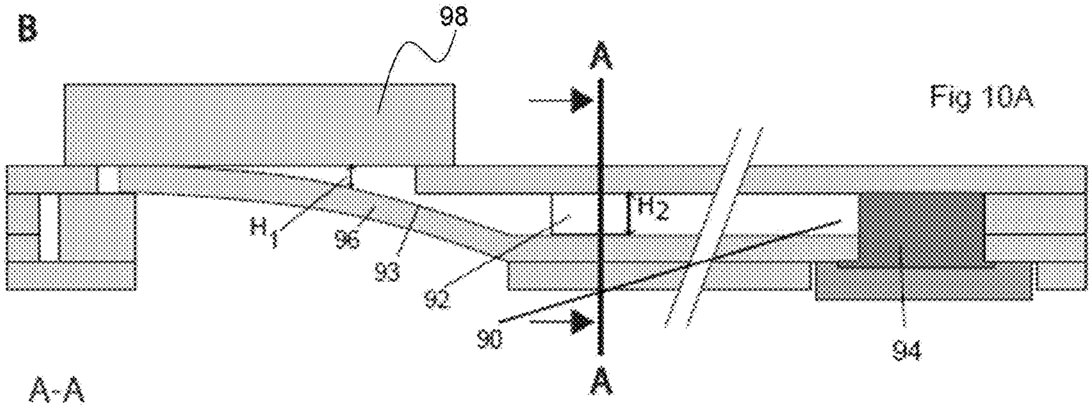
FIGS. 10A-10B show cross-sectional views of a microfluidic device illustrating a pinch-off solution according to one embodiment of the present disclosure.
Figure 10B:
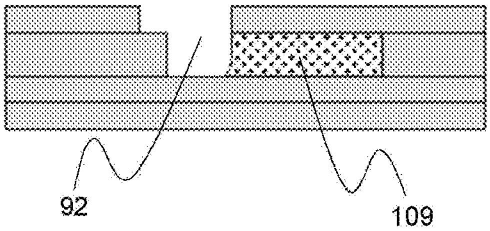

As an alternative to the metering 1 solution shown in FIG. 9A-B, in FIGS. 8A-C and FIGS. 10A-B the capillary height H1 under the membrane 98 can be reduced to be smaller than the height H2 of the metering channel thus preventing unwanted absorption of plasma below the membrane, but instead facilitating the formation of a bubble inside the metering channel 90 at the location of the vent 92. This is achieved by shifting the starting point of the slope 96 further outside of the membrane 98 to define the wedge-shaped extraction chamber which is formed between hydrophilic channel floor 93 and the filtration membrane 98, as illustrated in FIGS. 8B and 10A. This enables introduction of a bubble by placing a vent structure 92 in the metering channel 90. This embodiment of the present disclosure relates to using a pinch-off structure inside the metering channel 90.

Figure 11A:
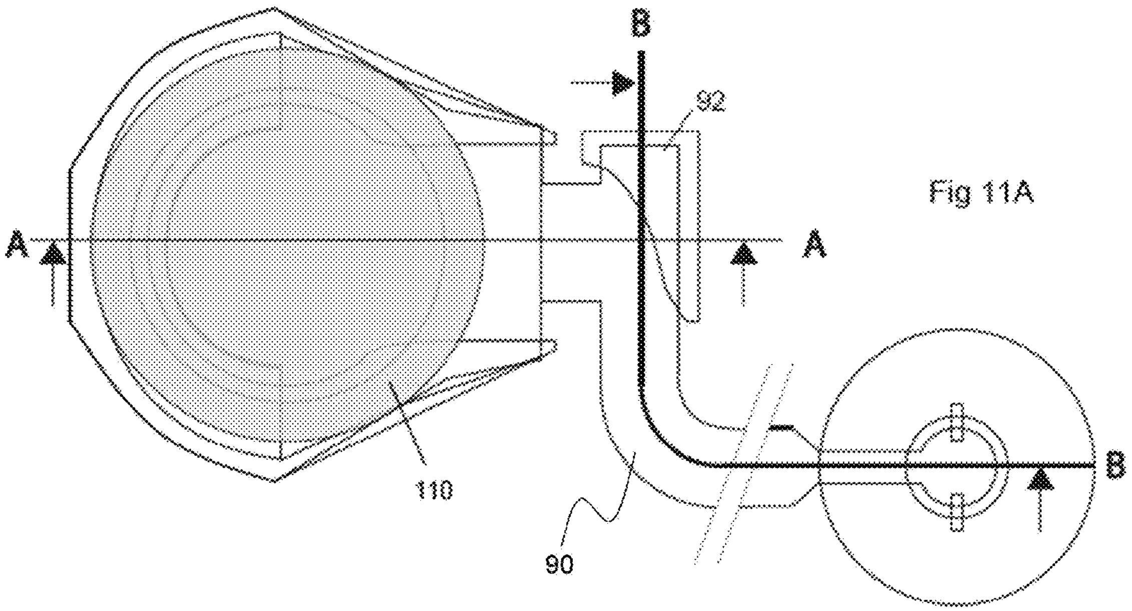
FIGS. 11A-C show plan and cross-sectional views of a microfluidic device illustrating a pinch-off solution according to one embodiment of the present disclosure.
Figure 11B:
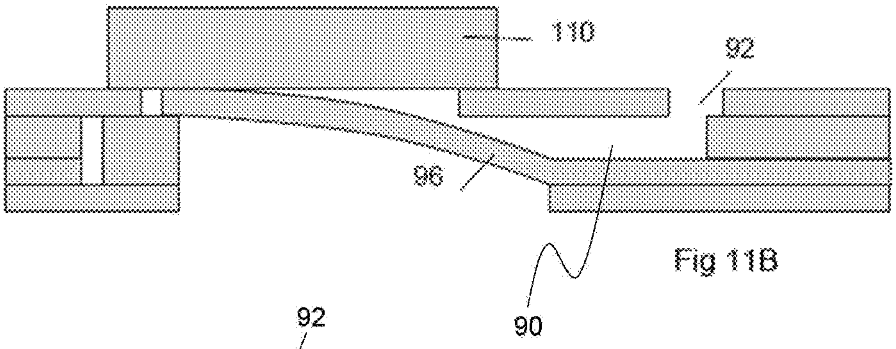
Figure 11C:
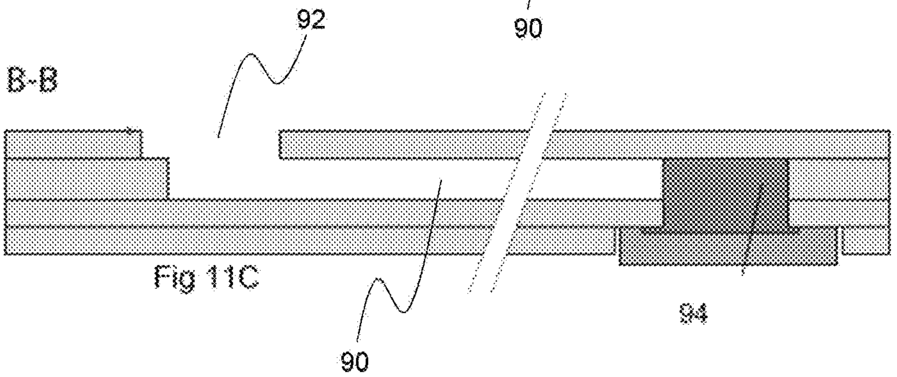

In FIG. 10A the maximum height H1 of the extraction chamber is less than the height of the metering channel H2, thus rendering H2 the highest capillary height in the metering channel 90. As the pinch-off occurs, this will cause a bubble to be pulled at the location of the vent 92 adjacent to the entrance to the metering channel 90 upon contact of the fluid in the metering channel 90 with a capillary means 94 at the outlet. FIG. 9B shows a transverse cross-sectional view taken along line A-A and illustrates filling of plasma 109 in the pinch-off region adjacent the air vent 92 prior to pinch-off through introduction of an air bubble FIGS. 11A-11C show an alternative embodiment of a microfluidic device with pinch-off inside the metering channel wherein the metering channel is non-straight, e.g., substantially Z-shaped. FIG. 11A shows a top plan view of the microfluidic device with a filtration membrane 110 arranged above the extraction chamber similar to the embodiment in FIG. 8A. A vent 92 is arranged adjacent the metering channel 90 at a location where the metering channel 90 makes a 90-degree bend. This placement increases the surface area of the liquid-air interface at the vent 92, as will be described more in detail below. FIGS. 11B and 11C show cross-sectional views taken along lines A-A and B—B, respectively, illustrating the structures of the microfluidic device.

Example 7—L-Shaped Metering Channel

Testing of various prototypes has revealed that it was necessary to carry out the bubble pinch-off as fast as possible, i.e., as close as possible to the position where the extraction chamber meets the metering channel to avoid absorption of surplus plasma from under the membrane. The unwanted absorption of plasma from under the membrane depended on the blood properties, i.e. hematocrit levels, which was not acceptable. Unwanted absorption of plasma is a result of the resistance (or lack thereof) exhibited by the membrane compartment. This is generated by factors such as clogging of pores in the membrane with red blood cells (RBCs) (hence hematocrit dependent), interactions between membrane, channel bottom layer (the slope) and membrane etc.

Furthermore, while this system works adequately for blood with a hematocrit level of 55 or 45, it has been observed that for hematocrit levels of 35 or below, some of the plasma does not follow the desired flow path to the outlet, and thus the metering of the plasma is no longer accurate. The lower the hematocrit the fewer red blood cells to clog the membrane hence the lower resistance in the membrane. This resulted in that plasma flows very fast from the plasma extraction chamber into the metering channel and the bubble has difficulties in pinching off.

Figure 12:
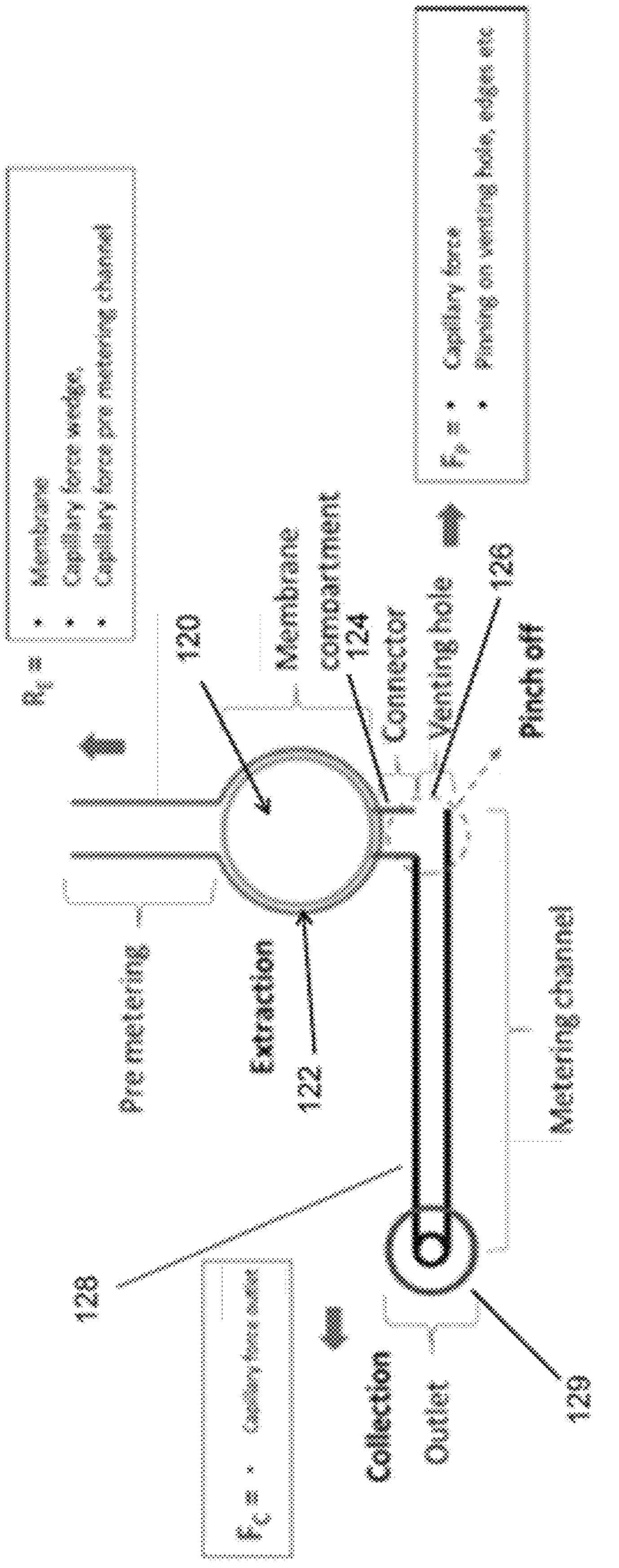
FIG. 12 shows a top plan view an embodiment of the microfluidic device which solves the metering accuracy problem by using a fluid connector with a venting hole between the extraction chamber and the metering channel.
Figures 13A, 13B, 13C, 13D:
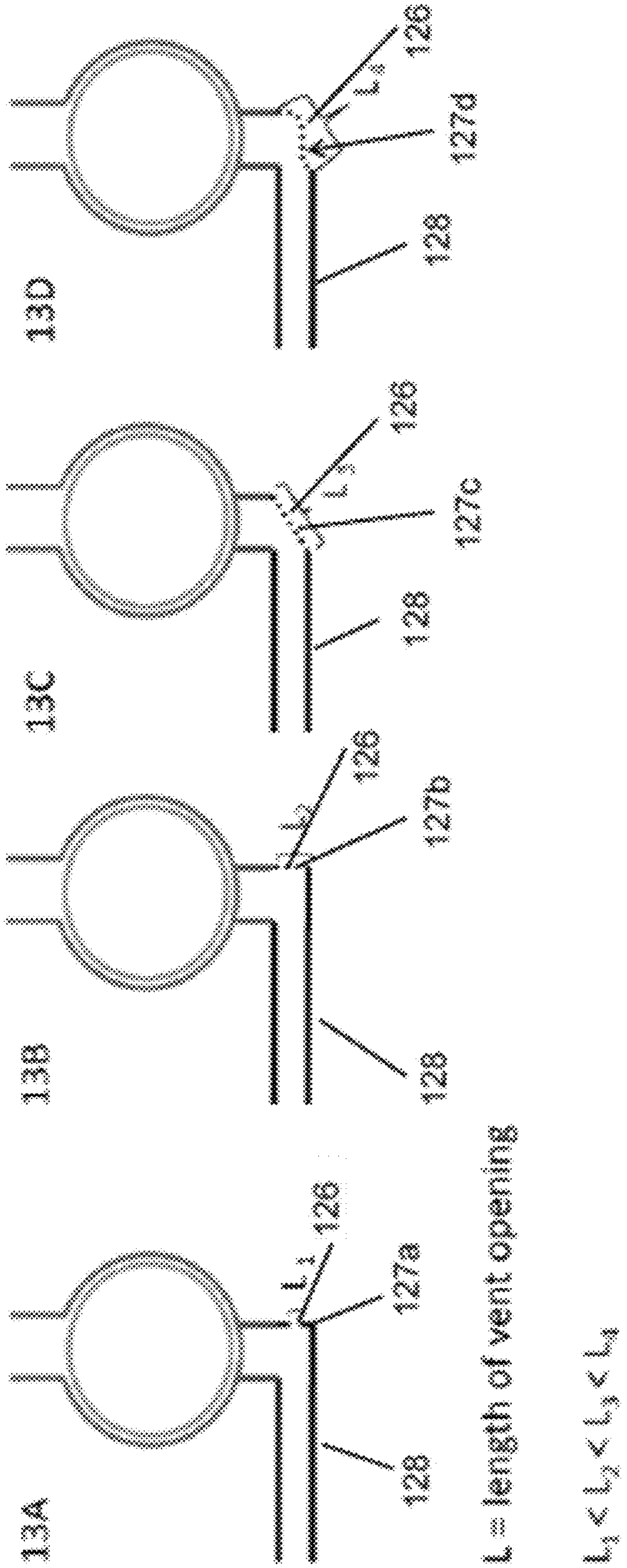
FIG. 13A-13D show top plan views of the microfluidic device comprising a fluid connector and four different venting hole designs.

By testing prototypes, it was found that one way of solving the metering accuracy problem was to use a fluid connector 124 between the extraction chamber 122 below the membrane 120 and the metering channel 128, as generally depicted in the embodiment of FIG. 12. The embodiment of FIG. 12 has a venting hole 126 that allows for introducing a bubble to pinch-off as close as possible to the fluid connector 124 and perform a pinch-off as quickly as possible after introducing the bubble in the system. This reduced the surplus HCT dependent flow from the membrane compartment. It has also been discovered that the geometry of the venting hole in the L-shaped metering channel plays a role in how easily a bubble can be introduced into the system. For a bubble to be introduced at the venting hole, $F_p < F_c$, where Fp is the capillary force acting on the liquid at the venting hole 126 and Fc is the capillary force acting on the liquid at the outlet 129. If $F_p > F_c$ a bubble will be pulled from the outlet 129 instead. For this reason, it is desired that Fp is as low as possible. The factors contributing to Fp are pinning of the fluid to edges of the venting hole 126, capillary forces and the liquid-air interface of the vent amongst others. It was empirically demonstrated that the larger the liquid-air interface, the easier it is to introduce a bubble. This is believed to be the result of the tendency of a liquid to shrink into the minimum surface area possible due to surface tension.

FIGS. 13A-13D show four different venting holes 126 designs where 13A has the smallest liquid-air interface 127*a*, 13B with a slightly larger liquid-air interface 127*b* substantially corresponding to the dimension of the metering channel 128, 13C with a larger oblique liquid-air interface 127*c*, and finally 13D with the largest non-straight liquid-air interface 127*d*. In design A, the liquid needs to expand from a small liquid-air interface to a larger one (the cross section of the metering channel). In B, it goes from the same cross-sectional liquid-air interface throughout the bubble formation. In both C and D however, liquid-air interface at the vent is larger than the channel cross section resulting in that less force is required for bubble introduction in the channel.

Example 8—Method of Production

One embodiment of the microfluidic device relates to enabling a slope in a microfluidic substrate in order to generate a height gradient.

Initiating plasma flow from a plasma extraction membrane requires a force which can be exhibited passively (capillary driven) or actively by applying an external force.

One way of establishing capillary flow is placing a plasma extraction membrane at an angle across a microchannel opening. The membrane then forms an acute angle between the channel bottom and roof creating a capillary force driven flow under the membrane which is transported into the microchannel. The time it takes for a specific blood volume to pass through the membrane and extract its plasma is in general in the range of minutes and is depending on the hematocrit of the blood, hence it can also vary. Given this timespan, it is necessary to protect the blood sample from evaporation during the extraction. From a usability point of view, it is also necessary to protect the blood volume from contamination. Consequently, for enabling a product using microfiltration-based plasma filtration, the filtration membrane needs to be integrated in a chamber construction.

From a microfabrication point of view, integrating an uneven object like a plasma membrane placed at an angle into a chamber structure is challenging as it creates steps of different heights over a surface which are difficult to seal off liquid tight.

Generally, the plasma extraction membranes are constructed from flexible polymer materials or cotton fibers resulting in that the wedge construction offers no rigid support for subsequent layers to build on. For integration in a chamber, it is preferred that the plasma extraction membrane exhibits a horizontal surface. For enabling this, it is required to create a slope on the microfluidic substrate to create the wedge structure between channel and membrane.

The common industrially scalable manufacturing technologies such as micro injection molding, R2R hot embossing, were considered, as well as less scalable additive methods such as 3D printing, dispensing and casting. However, these methods were dismissed as inadequate. Firstly, the existed difficulties finding a manufacturer capable of producing a tool with a slope for injection molding or hot embossing or casting. Secondly, none of these methods were capable of producing the required hydrophilic surface of the slope. For these methods a hydrophilic treatment would be a requirement adding further complexity to the manufacturing method. Lastly, none of these methods were scalable. To overcome these challenges, a solution for creating the slope was developed.

In particular, Example 7 demonstrates a method suitable to produce a height gradient in microfluidic channels in devices using foil substrates and lamination-based manufacturing technologies. The use of thin foils allows for bending the foil substrate or parts of it out of the plane to enable a slope that can be incorporated in a microfluidic substrate.

By isolating a part of the microfluidic bottom substrate, attaching it to a bottom substrate as in A and placing the other end of the isolated structure on top of a support structure as in B, a slope can be produced in the bottom substrate of the channel.

FIGS. 14A-14F show cross-sectional views illustrating steps in a manufacturing method according to one embodiment of the present disclosure, for producing a plasma sampling system in the form of a microfluidic device. In order to incorporate the plasma extraction membrane in a chamber to prevent the sample from evaporating, protect it from contamination and enable a pre-metering of the sample, it is necessary to have the plasma extraction oriented horizontally rather than in a slope as shown in WO 2016/209147 A1, the contents of which are incorporated herein in its entirety. In order still to have a wedge formed the between membrane and channel bottom, the suggested method for creating a slope in a channel was implemented.

Figure 14A:
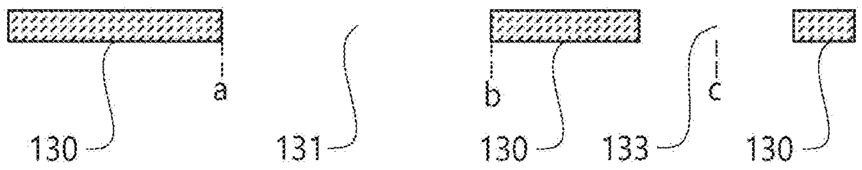
FIGS. 14A-14F show cross-sectional views illustrating steps in a manufacturing method of a microfluidic device according to one embodiment of the present disclosure.

FIG. 14A shows a first layer in the form of a bottom substrate foil 130 prepared with a first opening 131 for an extraction chamber extending between points a and b, and a second opening 133 at point c for accommodating a capillary means such as a paper substrate at an outlet.

Figure 14B:
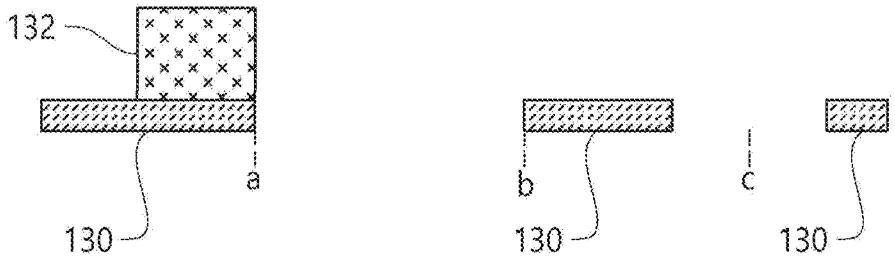

FIG. 14B shows a second layer in the form of a support structure 132 assembled on the first layer creating a plateau on the bottom substrate 130 adjacent point a of the first opening 131. The support structure 132 could be made out of dsPSA, dispensed or screen-printed polymer.

Figure 14C:
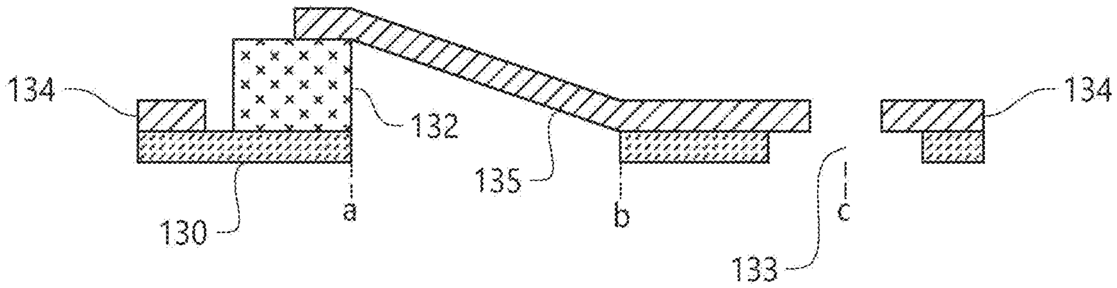

FIG. 14C shows a third layer in the form of a hydrophilic floor layer 134 assembled on the first and second layers. The third layer is intended to constitute a continuous floor of the extraction chamber as well as a metering channel in fluid communication with the extraction chamber, in one piece. To this end, the part forming the floor of the extraction chamber is inclined with respect to the floor of the metering channel such that a slope 135 is created. The free end of the slope 135 is supported on and attached to the support structure 132 adjacent point a, whereas the remaining part of the floor layer 134 is attached to the bottom substrate 130 adjacent point b and extending towards and at least partially covering the second opening 133 adjacent point c. Thus, the slope extends across the first opening 131 between points a and b. The floor layer 134 may have an opening which is aligned with the second opening 133 of the bottom substrate 130 when the two are assembled, thus forming an outlet port 142. The third layer may be composed of a hydrophilic foil material facing up and an adhesive layer facing down.

In one embodiment, the slope 135 is formed by a slot in the floor layer 134, delimiting a tongue portion. The slot can be substantially C-shaped to delimit a substantially circular or substantially square tongue portion on three sides. In this case, the free end of the tongue portion is supported on the support structure 132 adjacent point a, while the part of the floor layer 134 adjacent the free end of the tongue portion is attached to the bottom substrate 130, as shown on the left side of FIG. 14C.

Figure 14D:
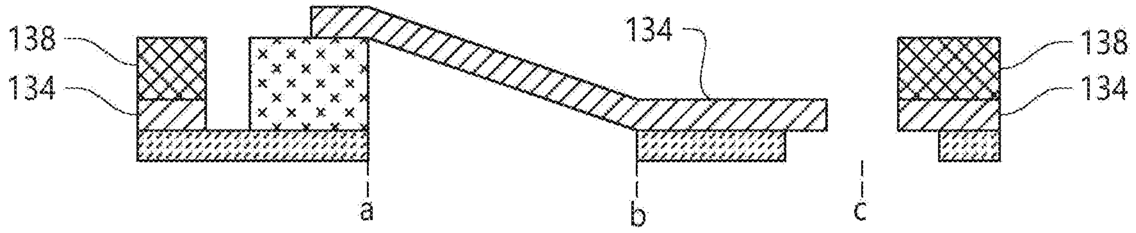

FIG. 14D shows a fourth layer in the form of a channel structure layer 138 assembled on the third layer 134. The channel structure layer 138 comprises an opening to accommodate the support structure 132 and the inclined slope 135 constituting the floor of the extraction chamber, as well as a slot which forms side walls of the metering channel. The fourth layer may be made from a double-sided PSA tape cut with a channel structure and membrane chamber opening.

Figure 14E:
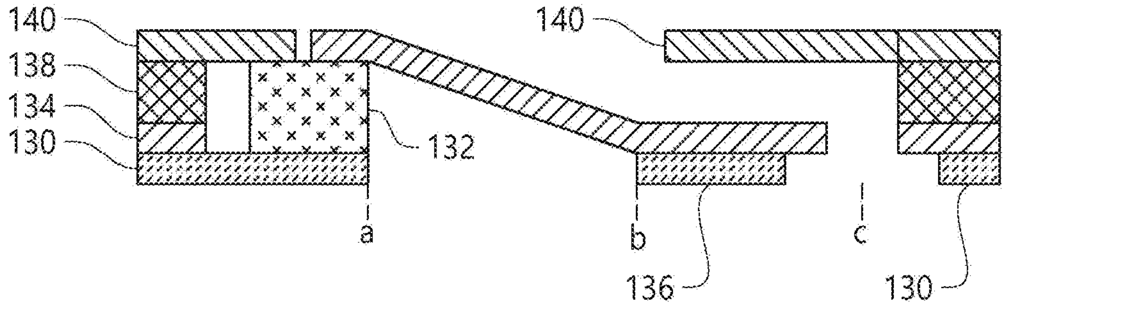

FIG. 14E shows a fifth layer in the form of a channel cover layer 140 assembled on the fourth layer. The channel cover layer 140 comprises an opening substantially corresponding to the size of the extraction chamber 137 and may be arranged such that a part thereof is attached to the support structure 132 adjacent the free end of the slope 135 of the floor layer 134. The fifth layer may be composed of a hydrophilic surface facing down and adhesive surface facing up. The hydrophilic surface constitutes the roof of the metering channel and the adhesive surface enables attachment of additional layers on top of the channel cover layer 140.

Figure 14F:
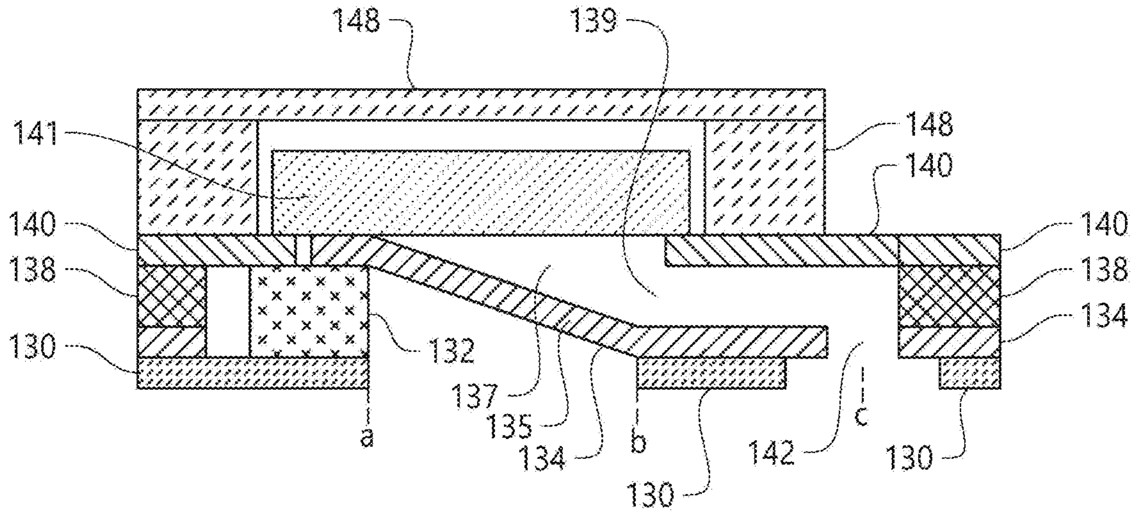

FIG. 14F shows the five-layer construction now providing a flat top surface facilitating subsequent assembly of a filtration membrane 141 and additional structures 148 to form a chamber around the filtration membrane 141. A wedge-shaped extraction chamber 137 is created between the floor layer 134 and the plasma extraction/filtration membrane 141 due to the slope 135 extending between points a and b. The extraction chamber 137 reaches its maximum height at the entrance 139 to the metering channel, adjacent point b.

Further embodiments of this invention involve increased use and exploration of height gradients in microfluidic systems. Such further embodiments are to be used in the applications mentioned in the background. For example, the sloped channel can be filled with either a liquid or a hydrogel to study diffusion effects.

FIGS. 15A-15F show a generalized microfluidic device with an inlet port 152, a first, pre-metering application, channel 154 and a second, intermediate, channel 156. A drop of body fluid 150 is applied to the inlet port and admitted to be transported by the capillarity of the first channel 154. When the fluid is transported to a means for visual inspection 155 such as an indicator window, the fluid is observed by the user who then removes excess fluid from the inlet port 152 whereby the fluid is admitted to be further transported, for example to any porous medium for collection, analysis or further processing. The device may further comprise a third, filtration, channel 158 with a higher capillarity than the pre-metering application channel 154 and the intermediate channel 156. Herein, the filtration channel 158 is arranged in fluid communication with a porous plug 159 that for example can be a filtration membrane or a lateral flow medium.

Figures 16A, 16B, 16C, 16D, 16E, 16F:
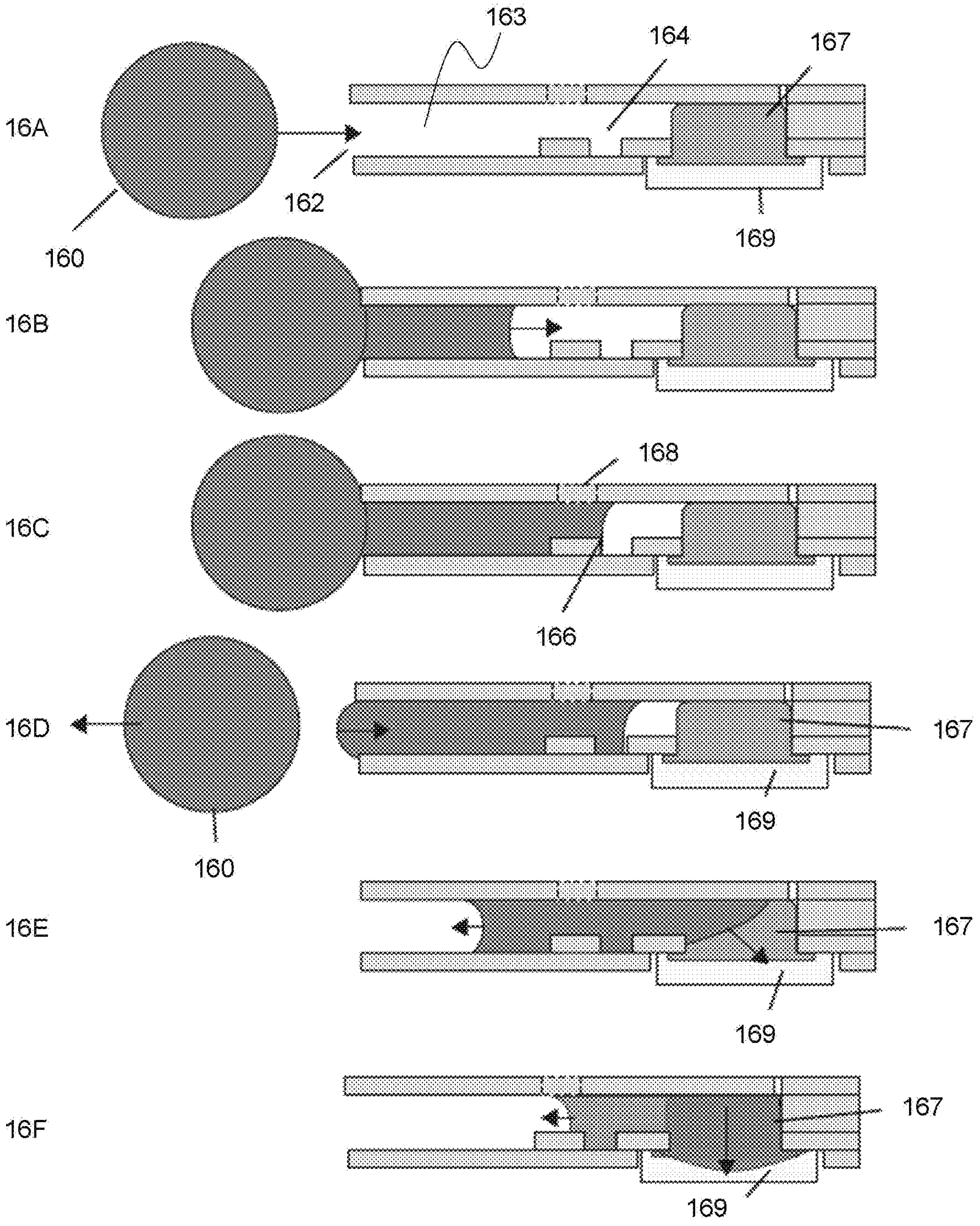
FIGS. 16A-16F show cross-sectional views of embodiments of the present disclosure having a capillary stop valve arranged in fluid communication with a pre-metering channel.

FIGS. 16A-16F show a microfluidic device with a capillary stop valve 166 arranged in fluid communication with a metering channel 164. FIG. 16A and FIG. 16B shows a how a drop of body fluid 160 is applied to the inlet port 162 and transported as a fluid flow by capillarity in a first channel 163 (also called application chamber) towards the metering channel 164. In FIG. 16C the fluid flow front has arrived at the capillary stop valve 166 which can be inspected by the user by the visual inspection means 168. In FIG. 16D the user removes the body fluid 160 from the inlet port 162 whereby a fluid column is formed which establishes a sufficient pushing force to overcome the capillary stop valve 166, so the fluid column is admitted to further proceed to the porous plug 167 (FIGS. 16 D & E) and be collected in the capillary means 169 (FIG. 16F).

Example 9—Manufacturing Outlet Portion

A method for connecting a microfluidic channel to a paper substrate which enables transferring of a liquid in the channel onto the paper is now disclosed; this method is compatible with mass manufacturing.

This method involves using a porous, but highly compressible material which can conform to the shape of the outlet hole and be compressed to allow for the paper substrate to contact the adhesive on the bottom of the channel substrate. The porous material could be dispensed into the hole or be placed over the hole and then compressed into it. Materials that could be used for the porous plug include, for example, micro paper pulp, micro fibrillated cellulose (MFC), open-cell hydrophilic polymer foams or a highly compressible glass fiber web.

Figures 17A, 17B:
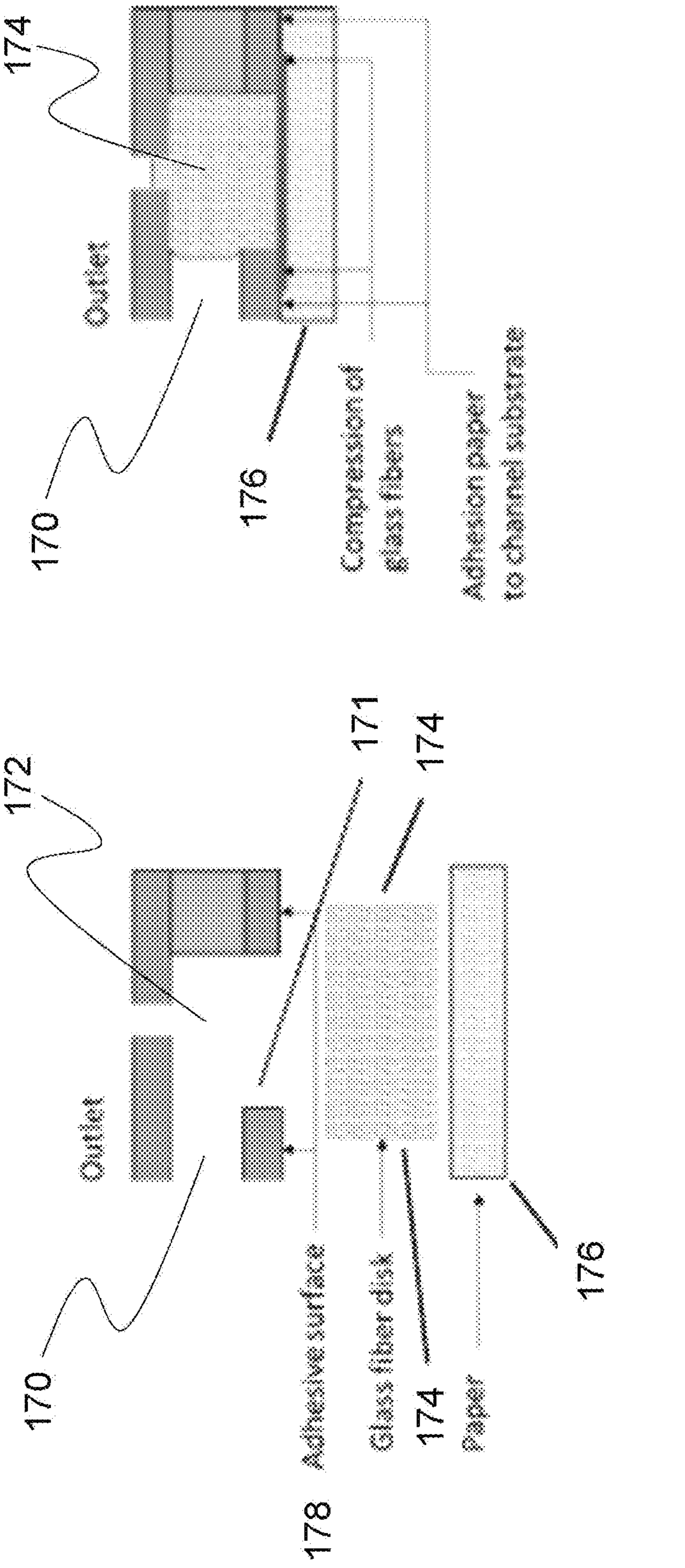
FIGS. 17A and 17B show cross-sectional views of an embodiment of a manufacturing method for an outlet portion of a microfluidic device.

FIGS. 17A and 17B show cross-sectional views of an embodiment of a manufacturing method using glass fiber web, before and after assembly. In FIG. 17A, an outlet of a microfluidic device is shown, at the distal end of a plasma metering channel 170 terminating in an outlet hole 171, forming a cavity 172. A porous plug 174 made of glass fiber material is arranged adjacent the outlet hole 171 to form a bridge element between the metering channel 170 and capillary means such as a paper substrate 176. The porous plug 174 has been cut smaller than the paper substrate 176 to allow for bonding between an adhesive surface 178 on the underside of the floor layer of the microfluidic device and the paper substrate 176, but larger than the outlet hole 171 to ensure no gaps can be generated between porous plug 174 and the outlet 171.

Referring now to FIG. 17B, the porous plug 174 is inserted into and substantially fills the cavity 172 by application of a pressure to the porous plug 174 and the paper substrate 176. To this end, the porous plug 174 is arranged to conform to the shape of the cavity 172. In one embodiment, the porous plug 174 is formed of a compressible material which allows it to enter the outlet hole 171 and then expand into the cavity 172. As a result of the applied pressure, a compression of glass fibers adjacent to the outlet hole 171 is shown as a thick line.

In another embodiment, a dispensable material is dispensed into the outlet hole 171 and then allowed to set to form the porous plug 174. The volume of the material will adapt to arrive at the same result, i.e., a bridge element which conforms to the shape and substantially fills the cavity 172 while ensuring that no air gaps could form in the outlet geometry. At the same time allowing for adhesion between the paper substrate 176 and the bottom of the microfluidic device.

The particular design of the system solves several challenging issues in transferring a liquid from a channel to a paper: The use of a material which is highly compressible or can be dispensed, reduces the need for high precision-cutting and placement of the porous plug into the outlet hole. Consequently, this allows for application of the solution in automatized high throughput manufacturing. In this example, the glass fiber material and the 6 mm paper disk were punched out with diameters of 3 mm and 6 mm, respectively. The two discs were placed on the 2 mm diameter outlet hole and only aligned by the eye. The solution does also not need any PVA coating on the collection substrate which reduces cost of the technology.

Example 10—Straightening the Meniscus

The different flow profiles of a liquid in a rectangular microchannel depend on channel geometry and the interaction between channel material and liquid. The flow in the channels of the microfluidic device of the present disclosure is shear driven flow. Corner flow is influenced by corner angle and wetting contact angle. In order to maintain continuous flow in a microchannel, bubble formation needs to be avoided.

Figure 18:
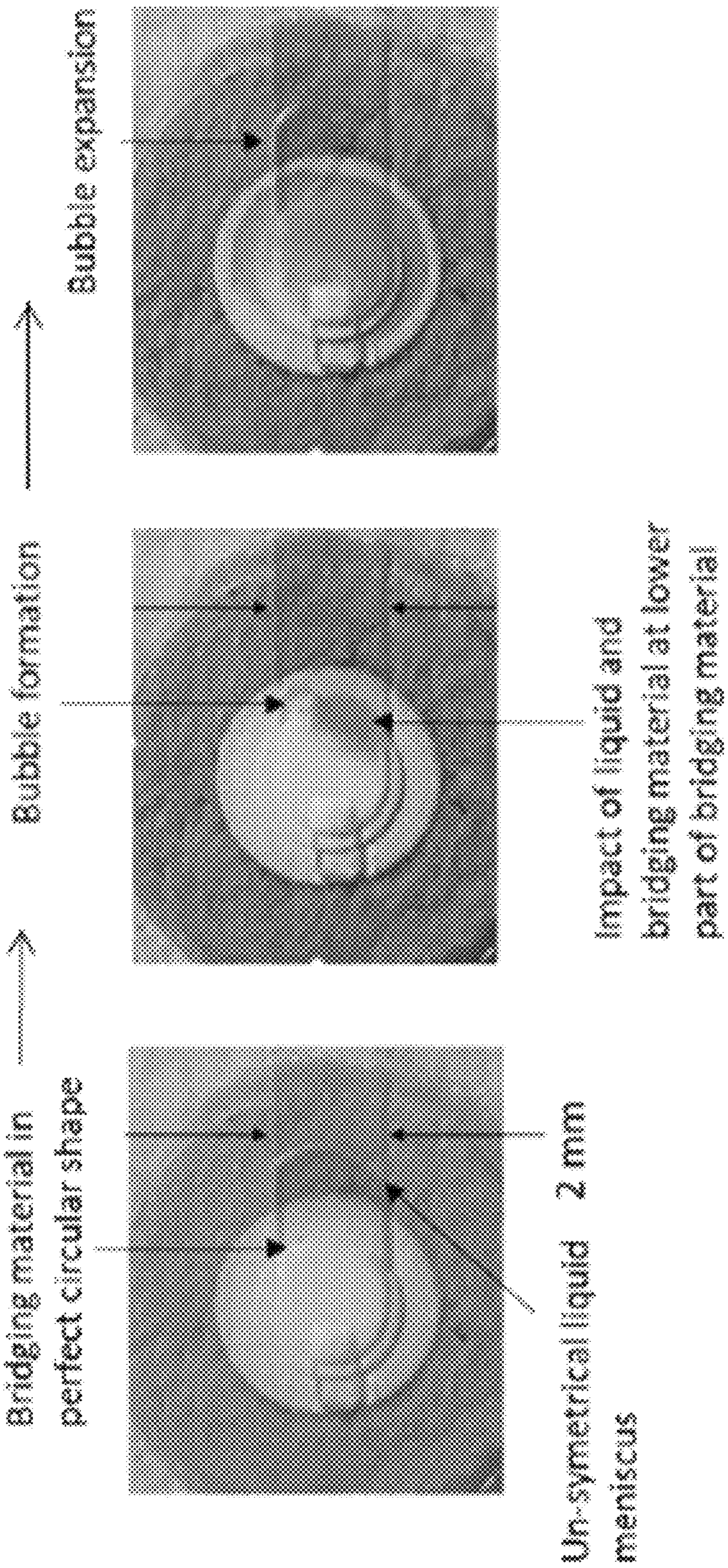
FIG. 18 shows top views of an example of bubble formation near at outlet in a microfluidic device.

FIG. 18 shows an example of bubble formation using a porous plug at the outlet. The liquid meniscus impacts with the porous plug at the bottom part of it causing a bubble to expand at the upper part of the plug. In this embodiment of the present disclosure the porous plug was made of glass fiber web.

FIG. 18 shows the sequence of events when a liquid meniscus in a channel encounters a porous plug entered into the outlet hole of the channel. Due to the mismatch in shape of the meniscus and porous plug, the first impact takes place at the bottom part of the plug causing air to be drawn into the system and a bubble is formed which then expands into the channel. Since the goal is to transport the liquid from the channel to the paper, the presence of the bubble threatens to block and cut off the flow and, if the liquid in the channel to be emptied is metered, this will reduce the metered volume by its presence.

Bubble formation can be avoided by adapting the shape of the fluid front meniscus to the geometry of the capillary means such that the shapes at the interface match each other.

To ensure that no bubbles are generated during the interaction between the porous plug and the liquid meniscus, it is foreseen to reduce the width of the metering channel. The reduction in width causes the liquid meniscus to go from a convex shape to a substantially straight, planar shape. At the same time, the curvature of the interface of the porous plug has also been straightened through the reduction in channel width. The result is that the shapes of the interfaces match each other.

Figure 19:
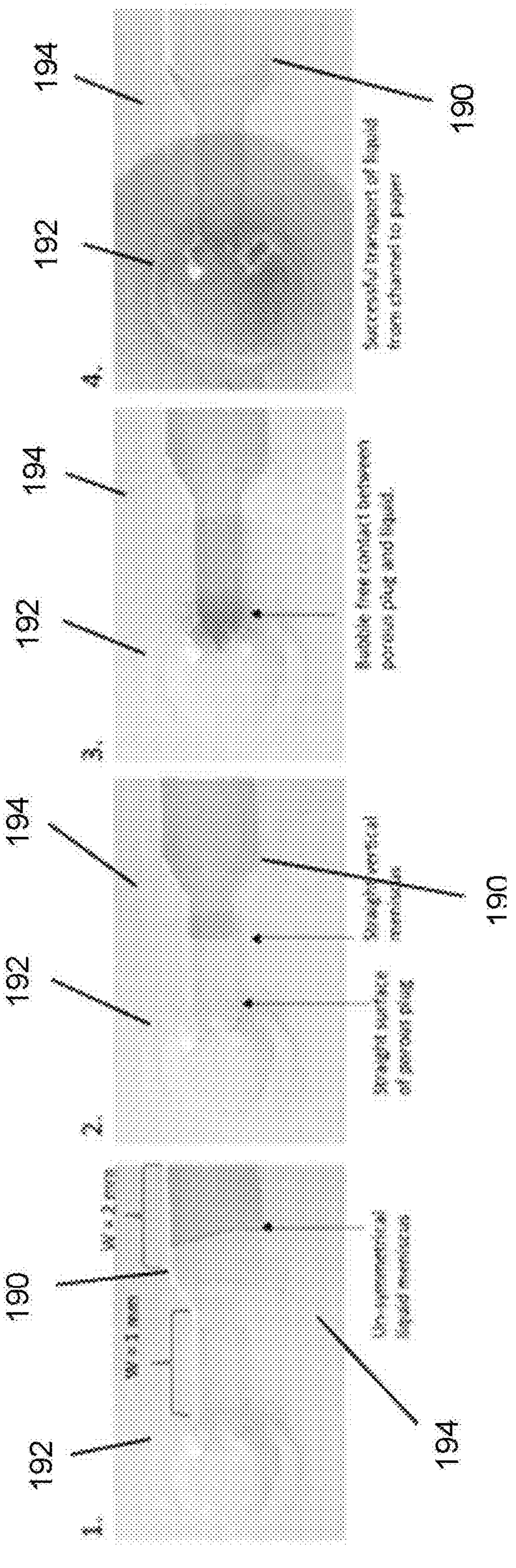
FIG. 19 shows top views of a successful transport of a liquid from a channel to a capillary means according to one embodiment of the present disclosure.

Referring now to FIG. 19, there is shown a successful transport of a liquid from a channel 190 to a paper substrate 194 using the proposed invention. This example uses a 3 mm diameter glass fiber material as a porous plug 192 and a 6 mm diameter paper disc substrate 194. In a first region, the channel 190 has a width of about 2 mm, in a second region the width of the channel 190 gradually narrows and in a third region the channel 190 has a width of about 1 mm.

The narrowing at the outlet allows for re-shaping of the liquid meniscus into a straight liquid front which facilitates control of the impact with the porous plug and prevents bubble formation at impact between the two medias. The solution using the glass fiber disc was proven robust in further investigations and was successfully evaluated for plasma extraction and metering of whole blood in the hematocrit range of 30-55 HCT.

Furthermore, this solution is readily applicable to other downstream systems for integration in point of care and rapid diagnostic test systems.

Figure 20:
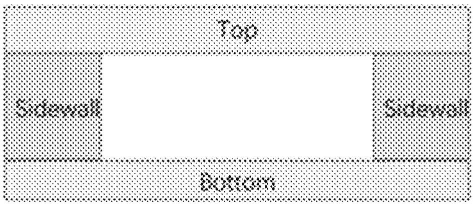
FIG. 20 shows a cross-sectional view of a metering channel in a microfluidic device according to one embodiment of the present disclosure.

FIG. 20 shows a cross-section of the metering channel in the presently disclosed microfluidic device. The top and bottom material is composed of a hydrophilic foil and the channel sidewalls of a double-sided pressure sensitive adhesive tape (dsPSA).

In this microfluidic system, the channel material (bottom, top and sidewalls) and cutting method creating the side wall characteristics (roughness, wettability after cutting, corner angle) affect the shape of the meniscus. The shape of the meniscus is critical at the time of connecting with the glass fiber bundle at the outlet to avoid pulling a bubble.

Different combinations of these parameters were tested, and the optimal combination for obtaining the shape of a meniscus that matches the shape of the outlet fiber bundle at the timepoint where the two connect to obtain bubble-free connection was discovered.

The following parameters were tested:

Hydrophilic Material for Top and Bottom (A<B<C in Degree of Hydrophilicity)

A. PCS
B. Tesa
C. Coveme polyester film

Sidewall Material; (Different Double-Sided Pressure Sensitive Adhesive Tapes)

D. Tesa
E. Produced in-house
F. PCS
G. AR Care
H. AR Seal

Cutting Method

I. Knife plotting
J. Laser A
K. Laser B

Outlet Narrowing Width

L. 1 mm
M. 0.7 mm
N. 0.4 mm

Figures 21A, 21B:
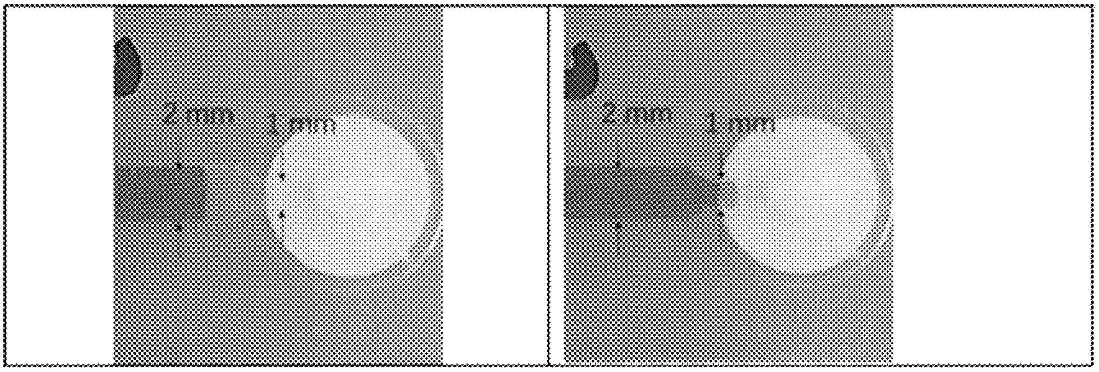
FIGS. 21A-21B show test results on a metering channel of narrowing width in a microfluidic device according to one embodiment of the present disclosure.

Results:

FIGS. 21A & 21B show a test using a channel of 2 mm width with a gradual narrowing, resulting in a width of 1 mm in the region adjacent the outlet. The bottom and top materials of the channel are made of Coveme, and the sidewalls of AR Seal. A Laser A cutting method was used. FIG. 21A shows a substantially planar meniscus in the 2 mm wide metering region; in FIG. 21B a convex meniscus is generated in the region of 1 mm width after narrowing.

Figures 22A, 22B, 22C:
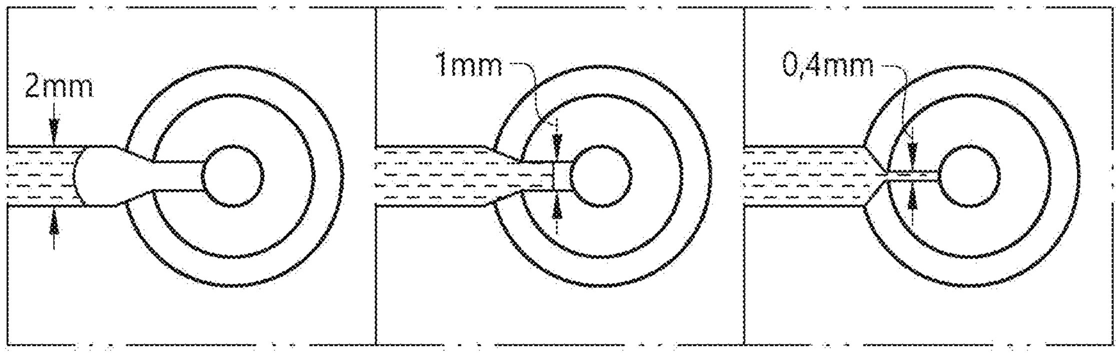
FIGS. 22A-22C show test results on a metering channel of narrowing width in a microfluidic device according to another embodiment of the present disclosure.

FIGS. 22A & B show a test using a channel of 2 mm width with a gradual narrowing, resulting in a width of 1 mm in the region adjacent the outlet. The channel's bottom and top material are made of Coveme, and the sidewalls of in-house produced double-sided pressure sensitive adhesive tape. A knife plotting cutting method was used. FIG. 22A shows a concave meniscus in metering channel in the 2 mm wide metering region, and in FIG. 22B the meniscus is still concave after reduction of channel width to 1 mm. In FIG. 22C the meniscus is planarized after further reduction of the channel width to 0.4 mm in the region adjacent the outlet.

FIGS. 21A-B and FIGS. 22A-C show how different menisci can be produced using the same hydrophilic foil Coveme in combination with two different cutting methods and materials. The resulting meniscus in the narrowing in FIG. 21B with its convex nature does not allow for bubble free connection to the fiber bundle due to its mismatching surface. A bubble free connection would not appear in the 2 mm region with a straight meniscus either. In FIGS. 22A-C, it was required to reduce the width of the outlet narrowing to 0.4 mm (FIG. 22C) to planarize the plasma meniscus and adapt it to the fiber bundle surface. However, the width of the narrowing was too small for allowing effective contact and emptying through the fiber bundle.

Figures 23A, 23B, 23C:
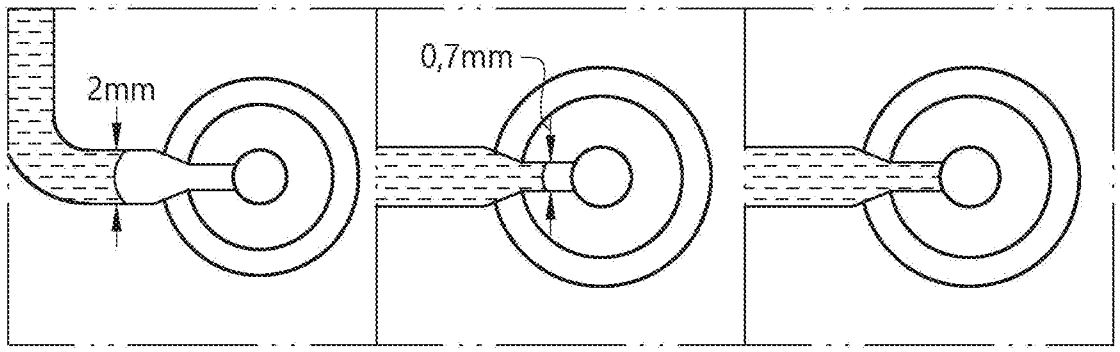
FIGS. 23A-23C show test results on a metering channel of narrowing width in a microfluidic device according to another embodiment of the present disclosure.

FIGS. 23A-C show the solution is implemented in the presently disclosed microfluidic device. FIGS. 23A-C show a test using a channel of 2 mm width with a gradual narrowing, resulting in a width of 0.7 mm in the region adjacent the outlet. The bottom and top material of the channel is made of Tesa, and the sidewalls of in-house produced double-sided pressure sensitive adhesive tape. A Laser B cutting method was used. In FIG. 23A a concave meniscus has formed in the metering channel and wobbling a bit as it proceeds through the metering channel. In FIG. 23B the meniscus is planarized and wobbles less after reduction of channel width to 0.7 mm, while in FIG. 23C, after further advancement the meniscus has become straight and adapted to the glass fiber bundle, allowing for bubble free connection and emptying.

Embodiments of a microfluidic device configured to sample, meter and collect a metered volume of body fluid for analysis by means of capillary transport and corresponding methods according to the present disclosure have been described. However, the person skilled in the art realizes that the embodiments can be varied within the scope of the appended claims without departing from the inventive idea.

All the described alternative embodiments above or parts of embodiments can be freely combined without departing from the inventive idea as long as the combination is not contradictory.

| List of Reference Numbers: | |
|---|---|
| 2 | microfluidic device |
| 4 | inlet port |
| 6 | first channel (pre-metering application channel) |
| 8 | second channel (intermediate channel) |
| 10 | third channel (filtration chamber) |
| 12 | filtration membrane |
| 14 | extraction chamber |
| 16 | vent structure/pinch-off structure |
| 18 | plasma metering channel |
| 20 | porous bridge element |
| 21 | outlet/outlet port |
| 22 | capillary means |
| 24 | inlet section |
| 25 | channel system |
| 26 | metering section |
| 28 | outlet section |
| 30 | body fluid (blood) |
| 32 | fluid rear meniscus |
| 35 | capillary stop valve |
| 36 | fluid front meniscus |
| 38 | hydrophilic bottom substrate |
| 40 | inlet port |
| 42 | first channel (pre-metering application channel) |
| 44 | indicator window |
| 46 | second channel (connecting capillary channel) |
| 50 | inlet port |
| 52 | pre-metering channel |
| 54 | indicator |
| 55 | metered volume |
| 56 | flow reduction gate (capillary stop valve) |
| 57 | overflow volume |
| 58 | second channel (sequent channel) |
| 60 | inlet port |
| 62 | first channel (pre-metering application channel) |
| 64 | capillary stop valve |
| 66 | indicator window |
| 68 | second channel (sequent channel) |
| 72 | compartment A |
| 74 | filtration element |
| 76 | compartment B |
| 80 | channel cover |
| 81 | filtration membrane |
| 82 | hydrophilic floor |
| 83 | height reducing element |
| 84 | pinch-off structures |
| 85 | slope |
| 86 | open sidewalls |
| 88 | capillary height |
| 89 | porous plug |
| 90 | metering channel |
| 92 | vent |
| 93 | hydrophilic channel floor |
| 94 | porous plug |
| 96 | slope |
| 98 | filtration membrane |
| 100 | filtration membrane |
| 102 | extraction chamber |
| 104 | slope |
| 106 | hydrophilic floor |
| 108 | metering channel |
| 109 | plasma |
| 110 | filtration membrane |
| 120 | filtration membrane |
| 122 | extraction chamber |
| 124 | fluid connector |
| 126 | venting hole |
| 127a | liquid-air interface |
| 127b | liquid-air interface |
| 127c | liquid-air interface |
| 127d | liquid-air interface |
| 128 | metering channel |
| 129 | outlet |
| 130 | first layer (bottom substrate foil) |
| 131 | first opening a-b |
| 132 | second layer (support structure) |
| 133 | second opening c |
| 134 | third layer (hydrophilic floor) |
| 135 | slope (floor of extraction chamber) |
| 136 | floor of metering channel |

-continued

| List of Reference Numbers: | |
|---|---|
| 137 | extraction chamber |
| 138 | fourth layer (channel structure) |
| 139 | entrance to metering channel |
| 140 | fifth layer (channel cover) |
| 141 | filtration membrane |
| 142 | outlet port |
| 148 | chamber structure |
| 150 | body fluid |
| 152 | inlet port |
| 154 | first channel (pre-metering application channel) |
| 155 | visual inspection means |
| 156 | second channel (intermediate channel) |
| 158 | third (filtration) channel |
| 159 | porous plug |
| 160 | body fluid |
| 162 | inlet port |
| 163 | first channel (pre-metering application channel) |
| 164 | second channel (sequent channel) |
| 166 | capillary stop valve |
| 167 | porous plug |
| 168 | visual inspection means |
| 169 | capillary means |
| 170 | metering channel |
| 171 | outlet hole |
| 172 | cavity |
| 174 | porous plug |
| 176 | paper substrate |
| 178 | adhesive surface |
| 190 | channel |
| 192 | porous plug |
| 194 | paper disk substrate |

The invention claimed is:

1. A multilayer microfluidic device configured to sample, meter and collect a metered volume of body fluid for analysis by means of capillary transport, wherein the device comprises:

an inlet section for receiving a body fluid sample, and a flat, laterally extending filtration membrane, wherein the inlet section comprises an inlet port and is configured to transport and access the sample to the filtration membrane;

a metering section, comprising an extraction chamber and a metering channel, the extraction chamber being configured to receive an extracted body fluid from the filtration membrane and arranged in fluid communication with the metering channel; and an outlet section configured to receive and collect a metered volume of body fluid from the metering channel, the outlet section comprising a capillary means for collection of the metered volume of body fluid, wherein a roof of the extraction chamber is defined by a flat lower surface of the filtration membrane, and a floor of the extraction chamber is continuous with a floor of the metering channel and extends at an acute angle from the lower surface of the filtration membrane, wherein the floor of the extraction chamber is inclined with respect to the floor of the metering channel to create a slope, and wherein the extraction chamber is wedge-shaped with the floor and roof of the extraction chamber diverging from each other in a direction towards the metering channel.

2. The device according to claim 1, comprising, from the bottom of the device to the top of the device:

a bottom layer;

a hydrophilic floor layer forming the floor of the extraction chamber and the metering channel; and a support structure for the floor layer, wherein the support structure is arranged between the bottom layer and the floor layer such that a first part of the floor layer is supported on the support structure to contact the filtration membrane, and wherein a second part of the floor layer is supported on the bottom layer to form the acute angle between the filtration membrane and the floor layer in order to obtain the extraction chamber with a height gradually increasing towards the metering channel.

3. The device according to claim 2 comprising at least:

the bottom layer;

the support structure;

the floor layer;

a channel structure layer comprising an opening configured to accommodate the support structure and the inclined slope constituting the floor of the extraction chamber, and a slot which forms side walls of the metering channel; and a cover layer providing a flat roof surface for the metering channel.

4. The device according to claim 3, wherein the bottom layer comprises a first opening substantially corresponding to the size of the extraction chamber and a second opening arranged to accommodate the capillary means.

5. The device according to claim 3, wherein the channel structure layer comprises an opening arranged to accommodate the support structure, the floor of the extraction chamber and an outlet port of the outlet section.

6. The device according to claim 5, wherein said channel structure layer further comprises a slot forming side walls of the metering channel.

7. The device according to claim 3, wherein the cover layer comprises an opening substantially corresponding to the size of the extraction chamber, and wherein the lower surface of the filtration membrane is positioned thereon.

8. The device according to claim 3, wherein the cover layer has a first side with a hydrophilic surface facing the channel structure layer and a second, opposite side with an adhesive surface.

9. The device according to claim 8, further comprising at least one additional layer attached to the second side of the cover layer for assembling the inlet section and a device housing.

10. The device according to claim 2, wherein the floor layer comprises a slot delimiting a tongue portion which forms the floor of the extraction chamber, and wherein a free end of the tongue portion is supported on the support structure.

11. The device according to claim 10, wherein the slot is substantially C-shaped and the tongue portion is substantially circular or substantially square.

12. The device according to claim 2, wherein the floor layer comprises an opening forming an outlet port of the outlet section.

* * * * *